Feb. 18, 1969 R. W. GRIFFITH 3,428,354
CARGO HANDLING APPARATUS
Filed Jan. 12, 1967 Sheet 1 of 15
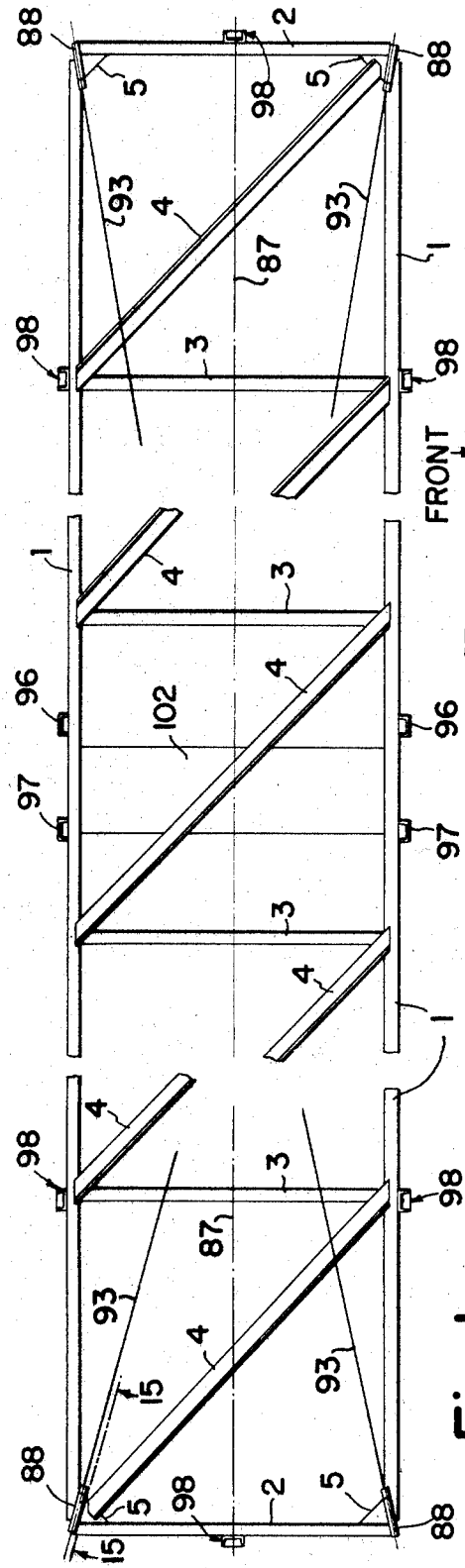
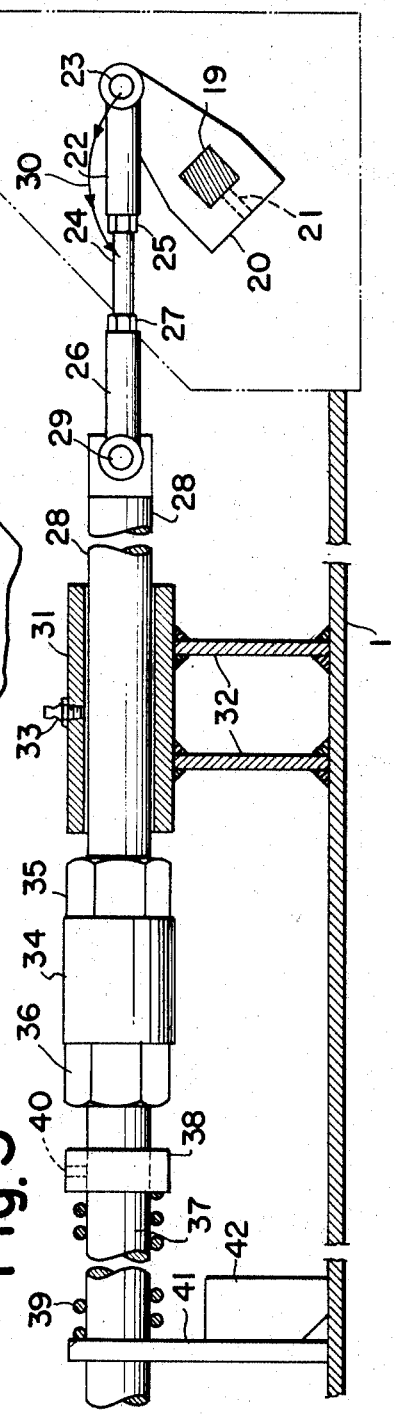
INVENTOR
RICHARD W. GRIFFITH
BY Donald R. Johnson
ATTORNEY

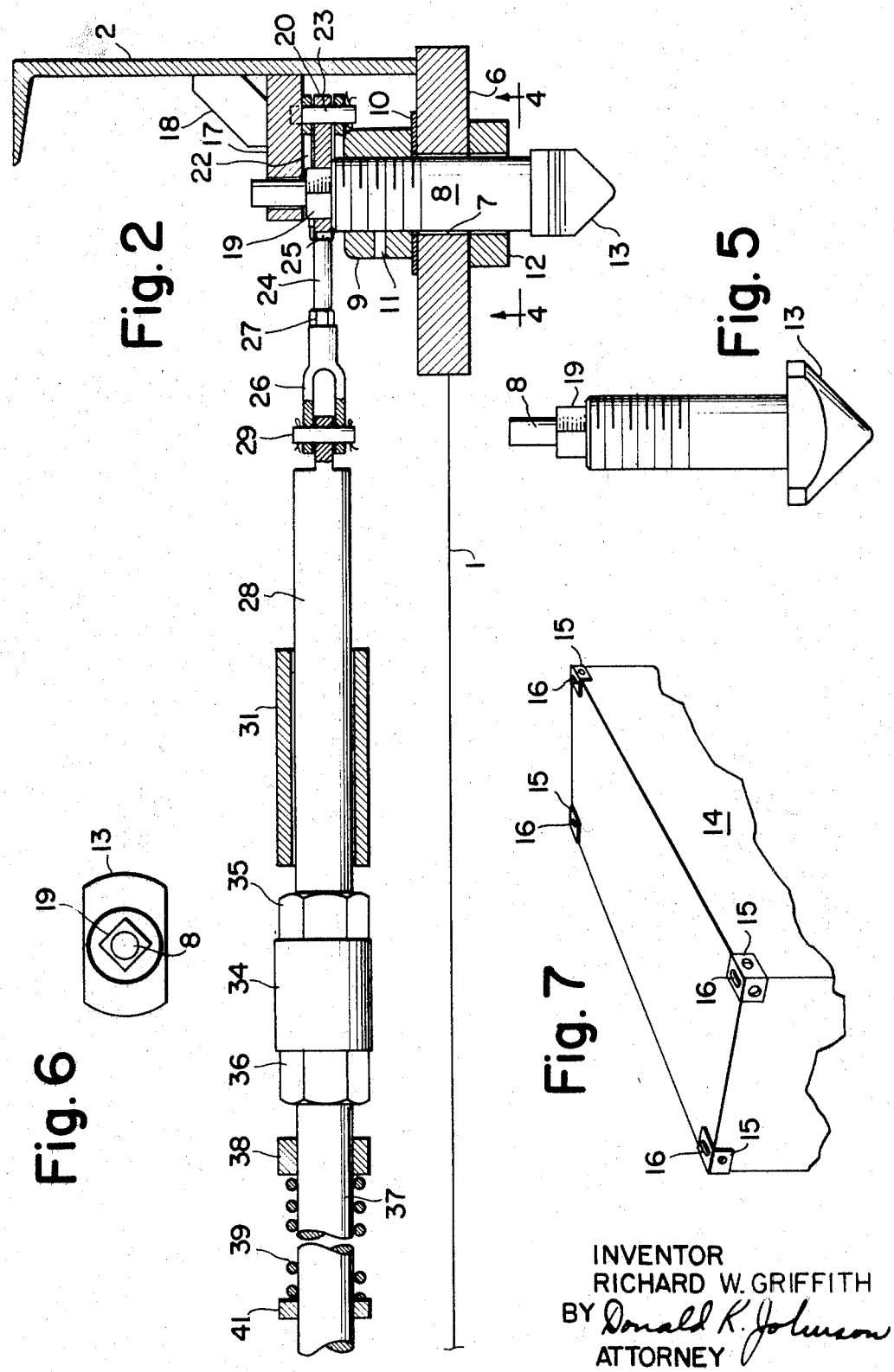

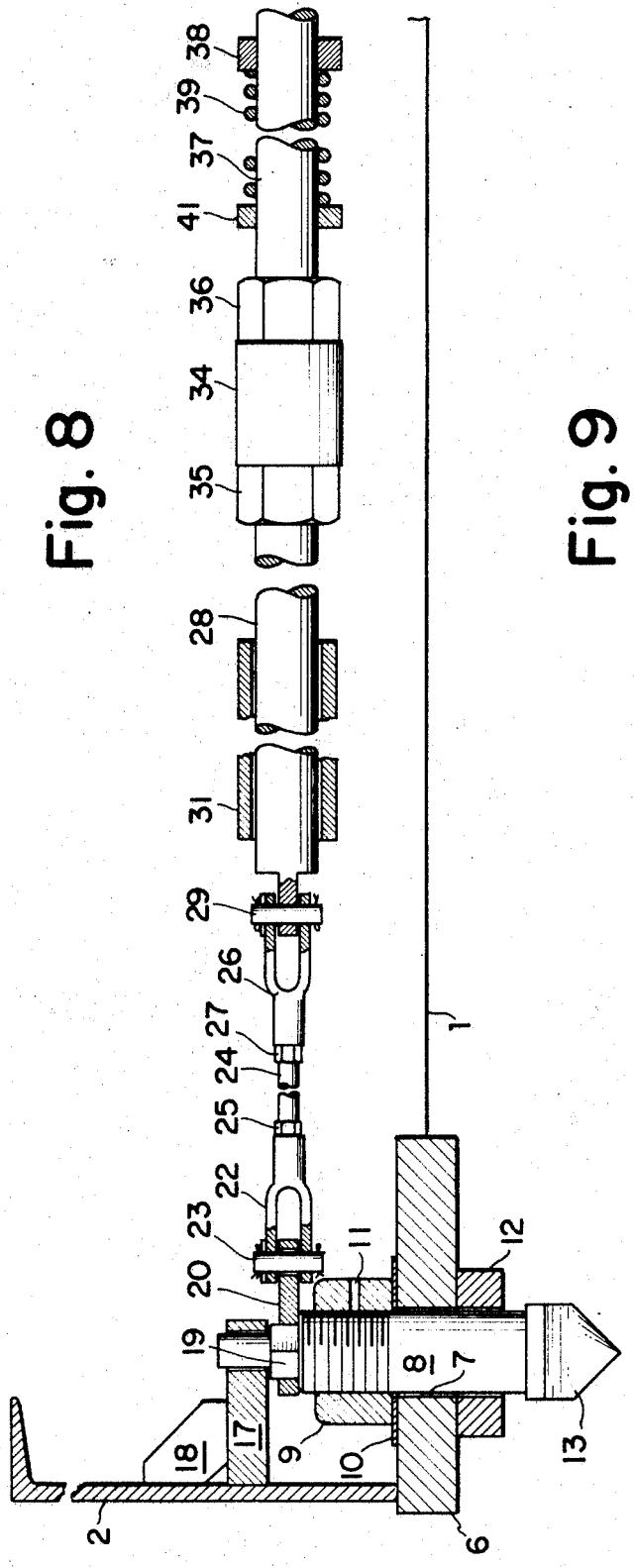
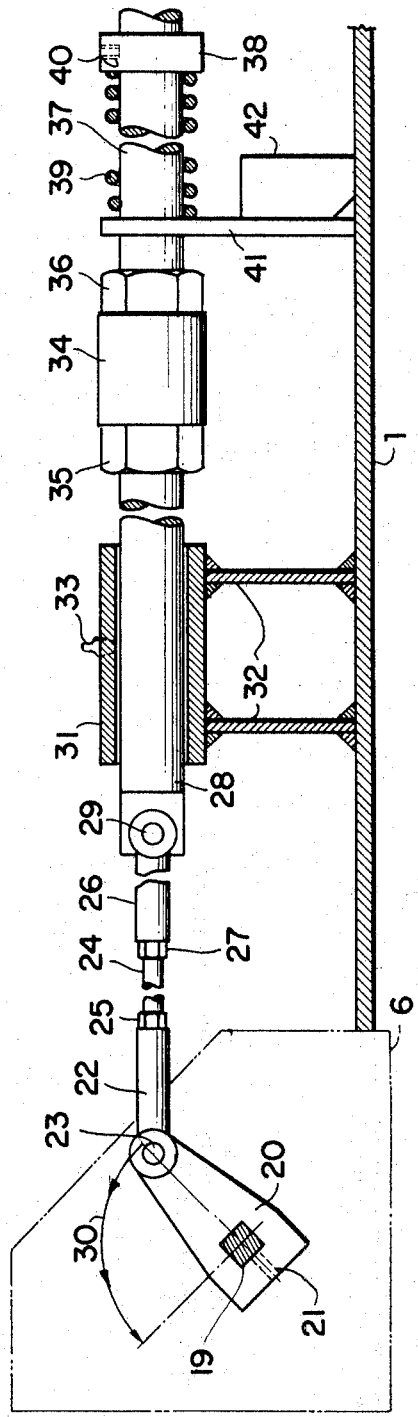

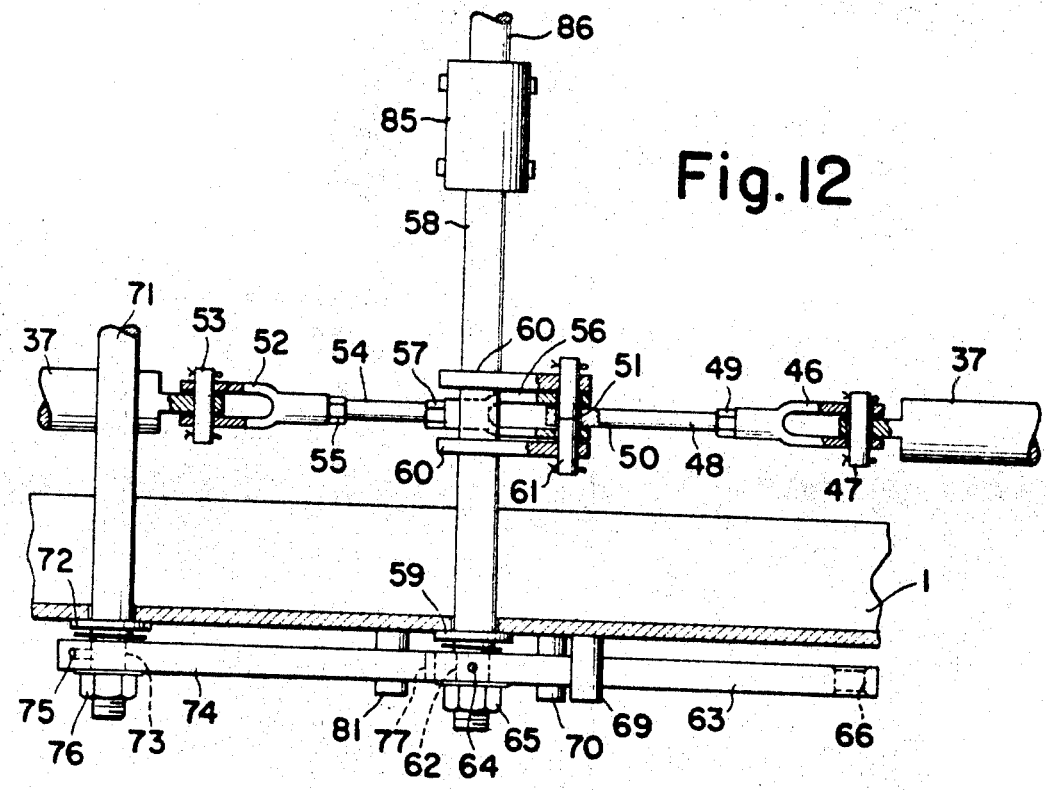
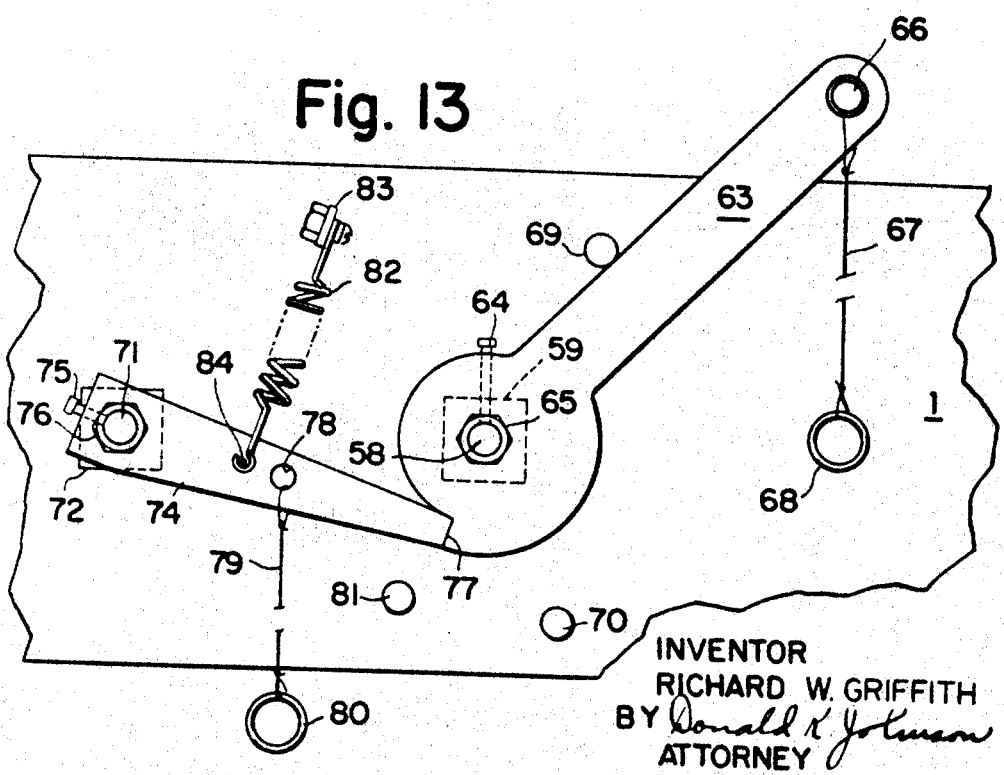

INVENTOR
RICHARD W. GRIFFITH
BY Donald R. Johnson
ATTORNEY

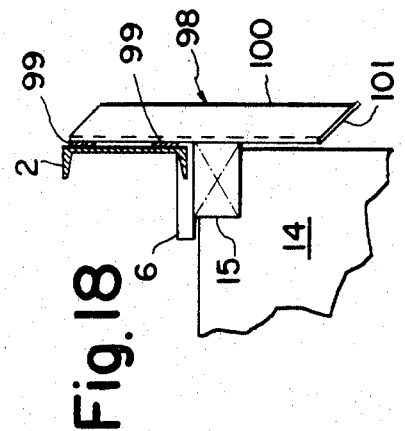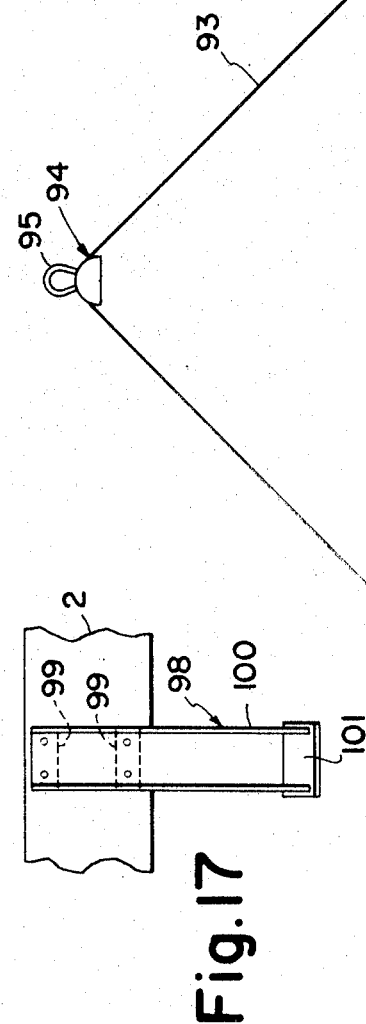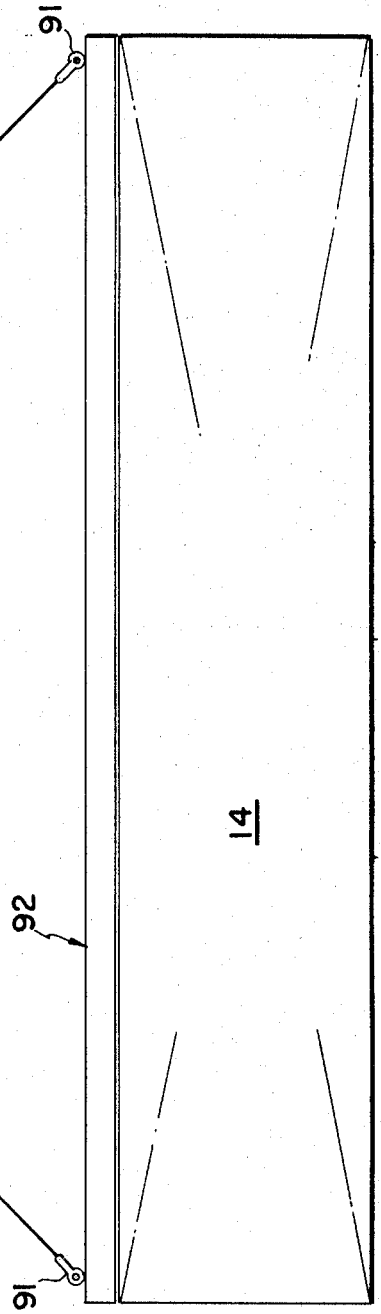

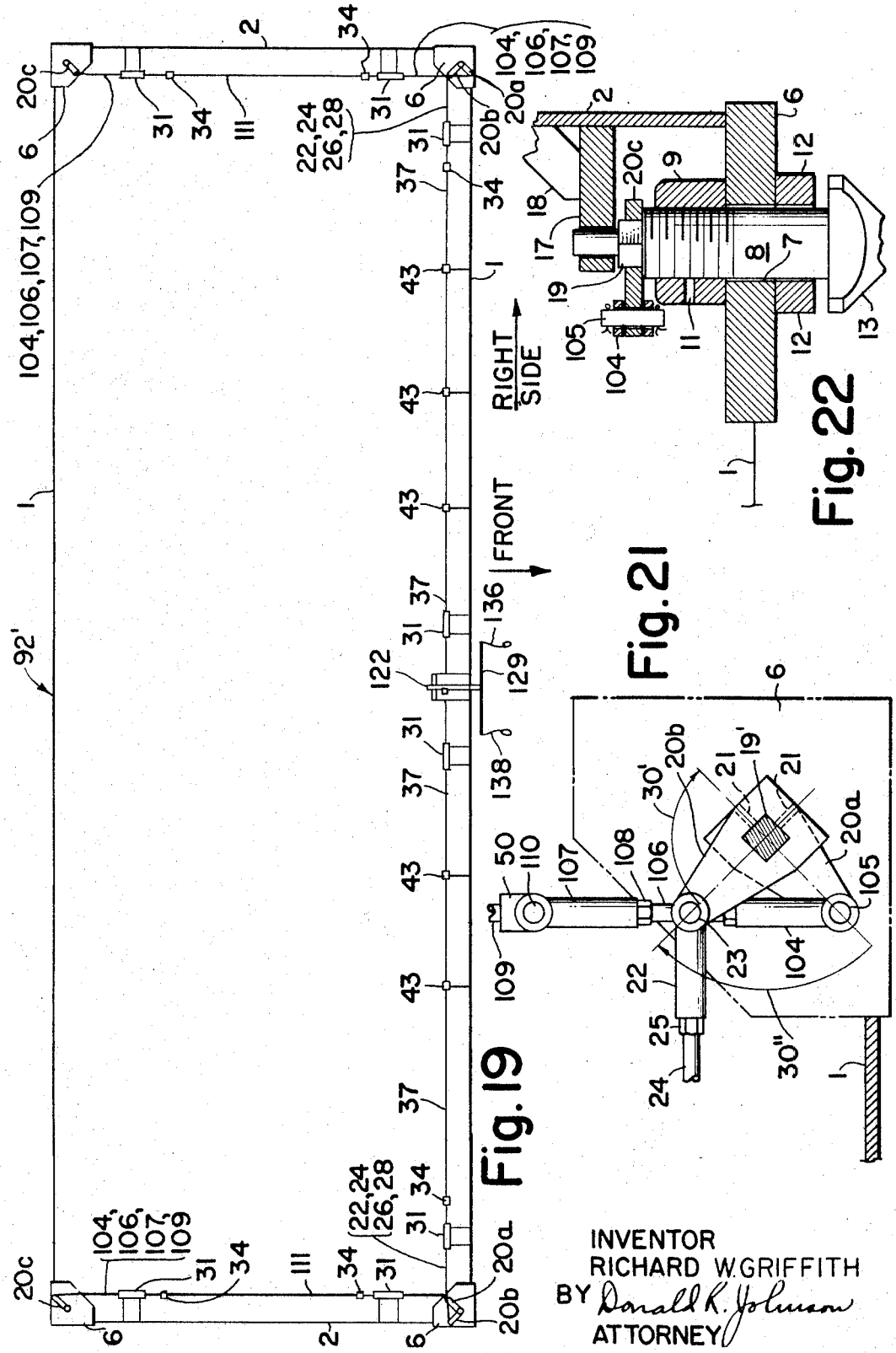

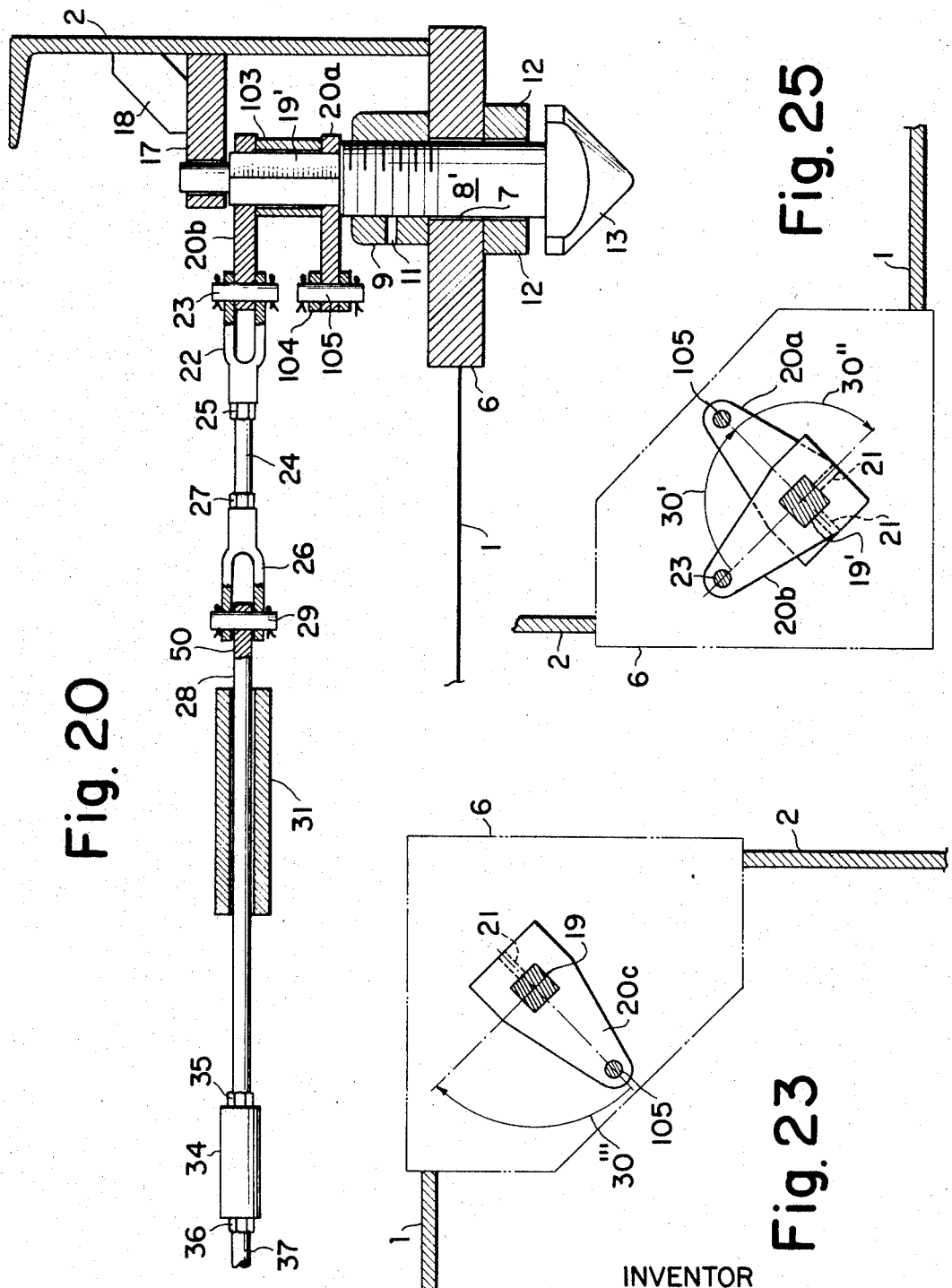

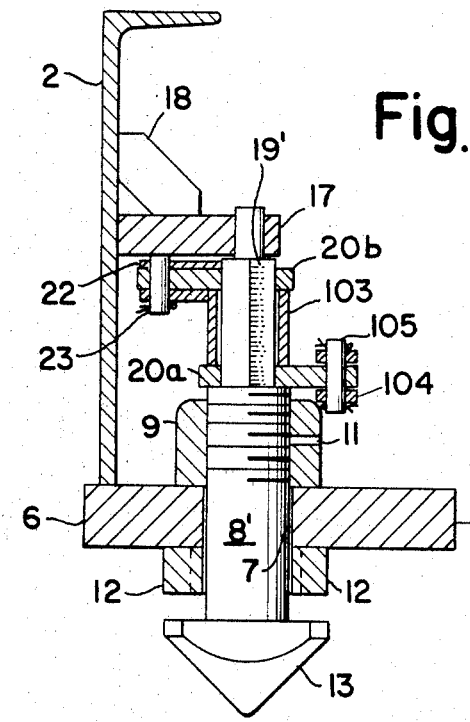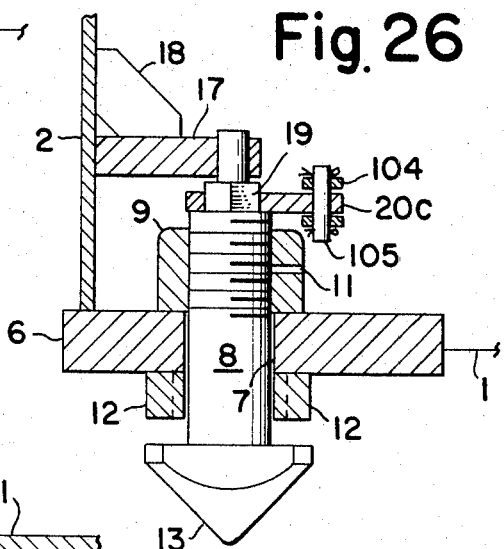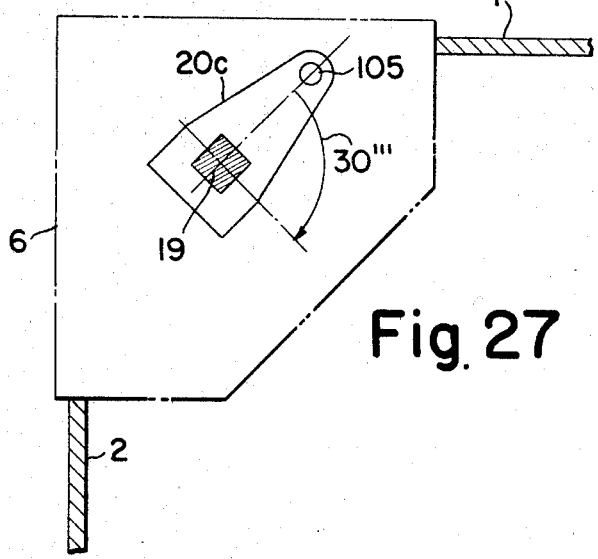

Feb. 18, 1969 R. W. GRIFFITH 3,428,354
CARGO HANDLING APPARATUS
Filed Jan. 12, 1967
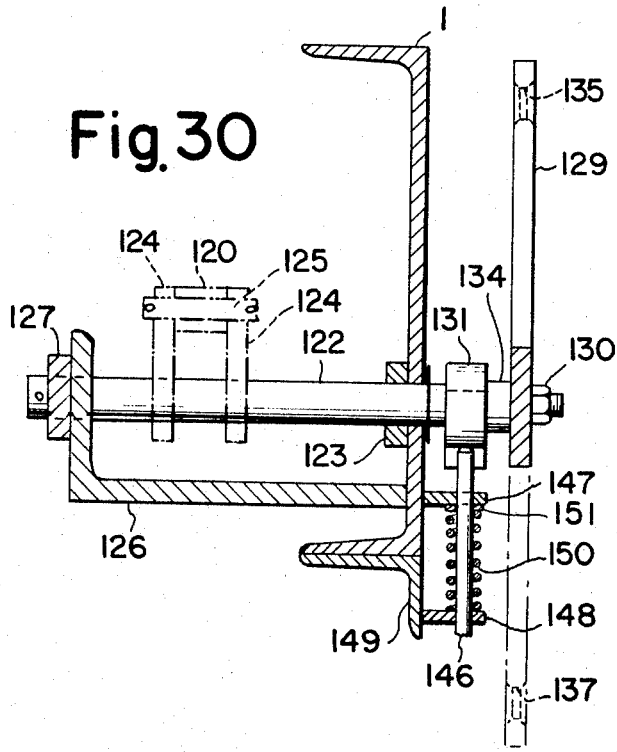
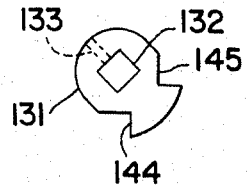
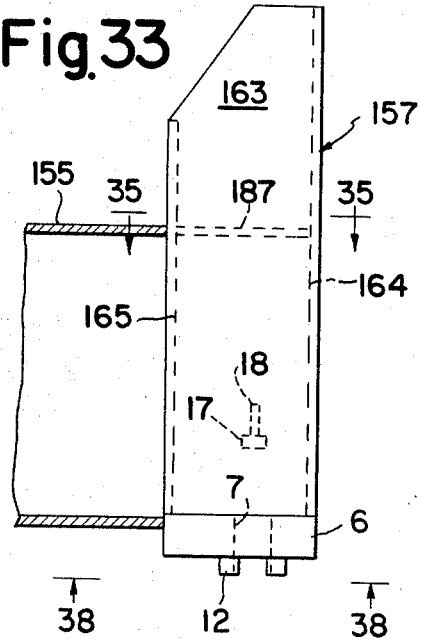
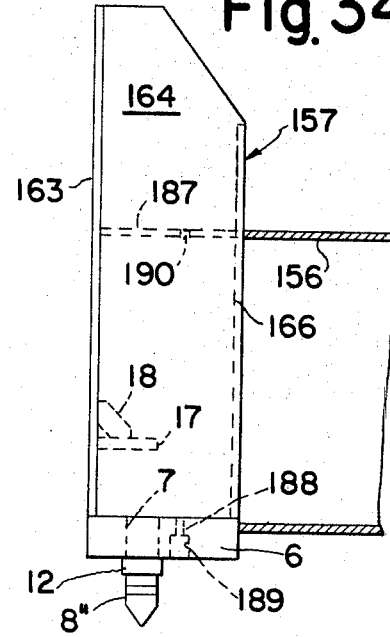
INVENTOR
RICHARD W. GRIFFITH
BY Donald R. Johnson
ATTORNEY

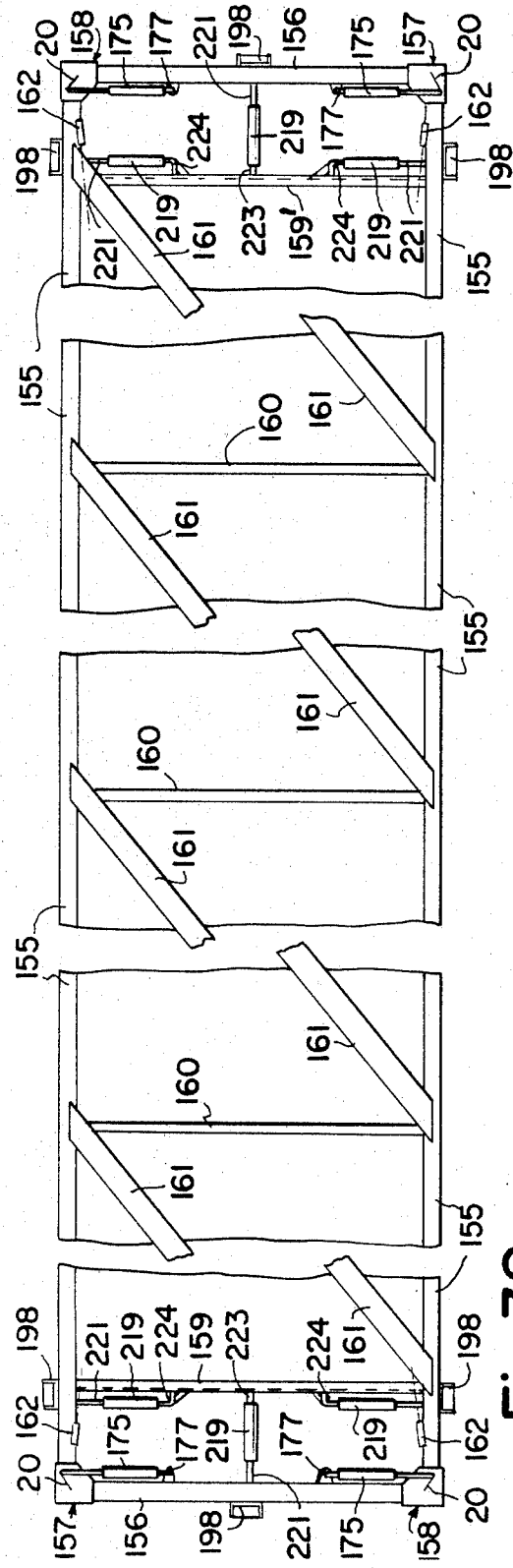
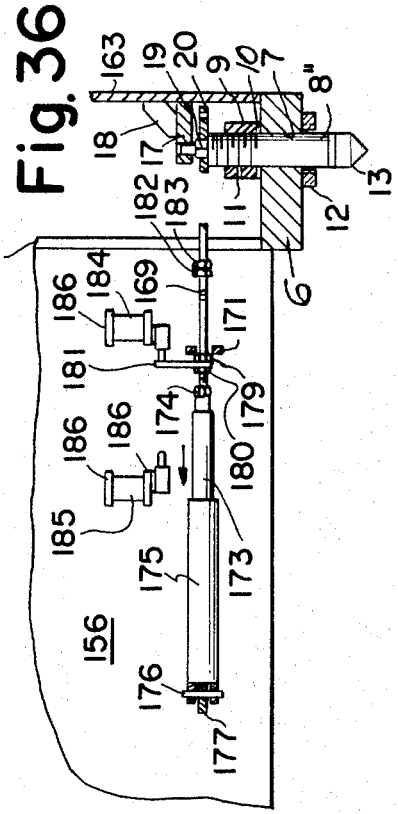
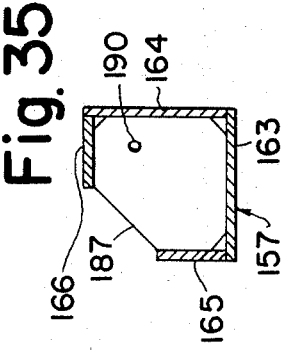

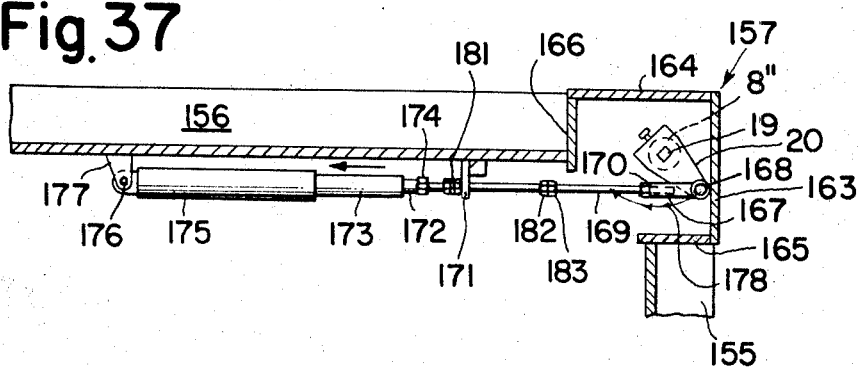
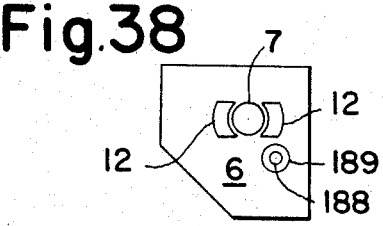
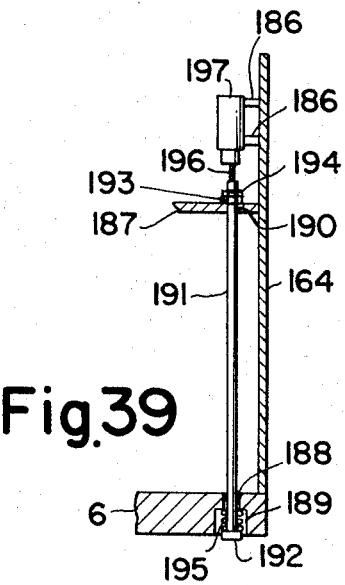
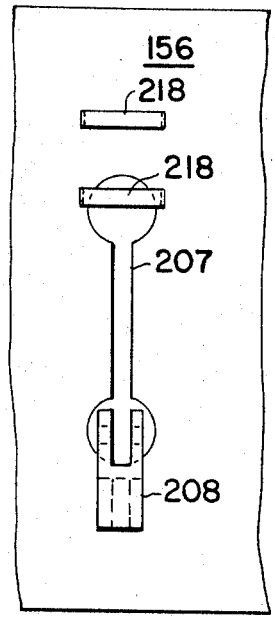

United States Patent Office 3,428,354
Patented Feb. 18, 1969

3,428,354
CARGO HANDLING APPARATUS
Richard W. Griffith, Green Ridge, Pa., assignor to Sun Shipbuilding & Dry Dock Company, Chester, Pa., a corporation of Pennsylvania
Filed Jan. 12, 1967, Ser. No. 608,838
U.S. Cl. 294—67      14 Claims
Int. Cl. B66c 1/42; B65j 1/12

ABSTRACT OF THE DISCLOSURE

For handling a hexahedral container of standard size having latching fittings at each of its four upper corners, a rectangular frame having rotary latches at each of its four corners is utilized. Unicontrolled means, operable manually from a location adjacent the frame or by means of push-buttons from a remote point, are provided for simultaneously rotating all four of the latches on the frame to latching or unlatching position.

*Cargo handling apparatus*

This invention relates to apparatus for handling cargo, and more particularly to apparatus for handling loaded containers of a standard size and construction.

Recently, there have come into use hexahedral cargo containers which are of standard size and construction. In use, cargo is stowed in such containers and the containers are then closed, following which they are transported (via truck, for example) to a port for loading aboard ship by means of cargo handling apparatus (gear) carried by the ship, or by other cargo handling apparatus. The present invention relates to the aforementioned cargo handling apparatus for containers.

The hexahedral cargo containers previously mentioned are, of course, of rectangular configuration seen in plan, and are generally of one or the other of two standard lengths, to wit, twenty feet and forty feet. The maximum loaded weight of the twenty-foot size may be twenty long tons, and of the forty-foot size, thirty long tons. The containers are handled by apparatus including a rigid frame (ordinarily termed a "spreader frame" or simply a "spreader") fabricated from steel and having a rectangular outer configuration conforming to the length and width of the containers to be handled.

For lifting purposes, the containers are provided with fittings (corner castings) of standard design at each of the four top corners thereof. To enable the containers to be held together when stacked one on top of another in a ship's cargo hold, the four bottom corners of the containers ordinarily also carry these fittings, but these bottom corner fittings are unimportant insofar as the present invention is concerned. One type of corner fitting which is now coming into use is that known as the ASA (American Standards Association) MH–5 Standard Fitting. This fitting comprises an open box-like housing formed as a casting and having a substantially rectangular slot in one wall thereof, one of these fittings being welded into each corner of the container. When such fittings are utilized at the top corners of the container, the slots are in the top walls of the respective fittings and the longer dimensions of the slots extend parallel to the length of the container. Each fitting provides a downwardly-facing latching abutment formed by that portion of the lower face of the top wall of the fitting which is located at the longer side edges of the rectangular slot therein.

The frame previously referred to carries latching members which are designed to mate with the respective latching abutments just described (which are located at the four top corners of the container), whereby the container may be fastened to the frame for suspension therebelow. That is to say, the container may be carried by the frame; the frame or spreader is in turn lifted by the ship's gear, for example by means of the ship's hoist or winch.

Since the slots, in the container corner fittings are closed at their ends, it may be appreciated that rotary motion is required to move a mating latching member (which is first passed down through the respective slot, from above the same) into engagement with the latching abutment provided under the lips formed at the longer side edges of the respective slot.

An object of this invention is to provide a novel spreader assembly for handling cargo containers.

Another obpect is to provide a spreader assembly for handling cargo containers equipped with ASA corner fittings.

A further object is to provide novel latching arrangements for container spreaders.

A still further object is to provide rotary-type latching arrangements for container spreaders.

As previously stated, container spreaders are handled by the ship's cargo gear (or other means), and it is often not possible (for various reasons) to manipulate this gear in such a manner as to bring the spreader into exact vertical alignment with the container to be lifted, such exact vertical alignment being necessary for proper matching of the latching members on the spreader with the latching abutments on the container. For this reason, several guide members are customarily carried by the spreader, these guide members in their operative positions extending somewhat below the lower face of the frame and being located just outside the outer edge of the frame; these guide members are adapted to come into contact with the sides of the container and "nudge" or "cam" the spreader, in one direction or the other, into the desired exact vertical alignment with the container.

Yet another object of this invention is to provide novel guide members for container spreaders.

Still another object is to provide a retractable guide member consrtuction for container spreaders.

An additional object is to provide, for container spreaders, retractable guide members which may be controlled in a selective manner from a remote point.

The objects of this invention are accomplished, briefly, in the following manner: A rigid frame, having a rectangular outer configuration conforming to the length and width of a hexahedral container to be handled, is provided with rotatably-mounted latching members at each of its four corners. These latching members are constructed and arranged to come into functional relationship with respective rotary-type (ASA) latching abutments carried by the upper corners of the container. In two different but related "mechanical" embodiments of the invention, the frame carries a common manually-operable means which is mechanically linked to the latching members in such a way that operation of this means causes simultaneous rotation of all four of the latching members. In one of these "mechanical" embodiments, the latching members are biased to the "locked" position and are manually operable against this bias to the "unlocked" position; in the other of these "mechanical" embodiments, the latching members are not biased and are freely manually operable either to the "unlocked" position or to the "locked" position. In a "hydraulic" embodiment of the invention, a separate double-acting hydraulic cylinder is mechanically linked to each respective one of the four latching members, and these hydraulic cylinders are controlled in concert from a remote point to simultaneously rotate the four latching members to "locked" position or to "unlocked" position, selectively. In this "hydraulic" embodiment, six retractable guide members, each mechanically linked to an individual double-acting hydraulic cylinder, are carried by the frame, one guide member being located adjacent each of the four corners and one guide member being located at the midpoint of each of the two shorter sides (or ends) of the frame. A selective arrangement is provided for operating these guide members from a remote point, each of the guide members on the shorter sides of the frame being operable individually, and each pair of the paired guide members (paired on the same longer side of the frame) being operable separately the two guide members composing each pair operating together as a pair.

A detailed description of the invention follows, taken in conjunction with the accompanying drawings, wherein:

FIG. 1 is a plan view of a typical spreader frame according to this invention;

FIG. 2 is a vertical sectional view of the latch mechanism at one corner of the spreader frame;

FIG. 3 is a plan view of the mechanism shown in FIG. 2;

FIG. 4 is a sectional view taken on line 4—4 of FIG. 2;

FIG. 5 is an elevation of a spud member, the spud being rotated 90° from its position in FIGS. 2 and 3;

FIG. 6 is a top view of the spud of FIG. 5;

FIG. 7 is a perspective view of the upper portion of a container;

FIG. 8 is a vertical sectional view of the latch mechanism at another corner of the spreader frame;

FIG. 9 is a plan view of the mechanism shown in FIG. 8;

FIG. 10 is a schematic view illustrating the arrangement of the various latching mechanisms on the spreader frame;

FIG. 11 is an elevational view of a detail;

FIG. 12 is a plan view of the operating mechanism for the latches;

FIG. 13 is a front elevation of the latch operating mechanism;

FIG. 16 is a somewhat diagrammatic front elevation of a spreader with a container, the spreader being suspended by means of slings;

FIG. 17 is a front elevation of a detail;

FIG. 18 is a side view of the detail shown in FIG. 17;

FIG. 19 is a view similar to FIG. 10, but of a second embodiment of the invention;

FIG. 20 is a view simialr to FIG. 2, but of the second embodiment;

FIG. 21 is a view similar to FIG. 3, but of the second embodiment;

FIG. 22 is a vertical sectional view of the latch mechanism at another corner of the spreader frame, according to the second embodiment;

FIG. 23 is a plan view of a portion of the mechanism of FIG. 22;

FIG. 24 is a partial vertical sectional view of the latch mechanism at another corner of the spreader frame, according to the second embodiment;

FIG. 25 is a plan view of a portion of the mechanism of FIG. 24;

FIG. 26 is a vertical sectional view of the latch mechanism at still another corner of the spreader frame;

FIG. 27 is a plan view of a portion of the mechanism of FIG. 26;

FIG. 30 is a central vertical section of the mechanism of FIG. 28;

FIG. 31 is a front elevation of a detail;

FIG. 32 is a plan view of a spreader frame, according to a third embodiment of the invention;

FIG. 33 is a front view of a corner box subassembly;

FIG. 34 is a side view of the corner box subassembly of FIG. 33;

FIG. 35 is a sectional view taken on line 35—35 of FIG. 33;

FIG. 36 is a vertical sectional view of the latch mechanism at one corner of the spreader frame, according to the third embodiment;

FIG. 37 is a horizontal sectional view looking at the top of FIG. 36;

FIG. 38 is a bottom view looking in the direction 38—38 in FIG. 33;

FIG. 39 is a vertical section showing a detail;

FIG. 42 is a partial rear view of the structure of FIG. 40.

Figure 14:
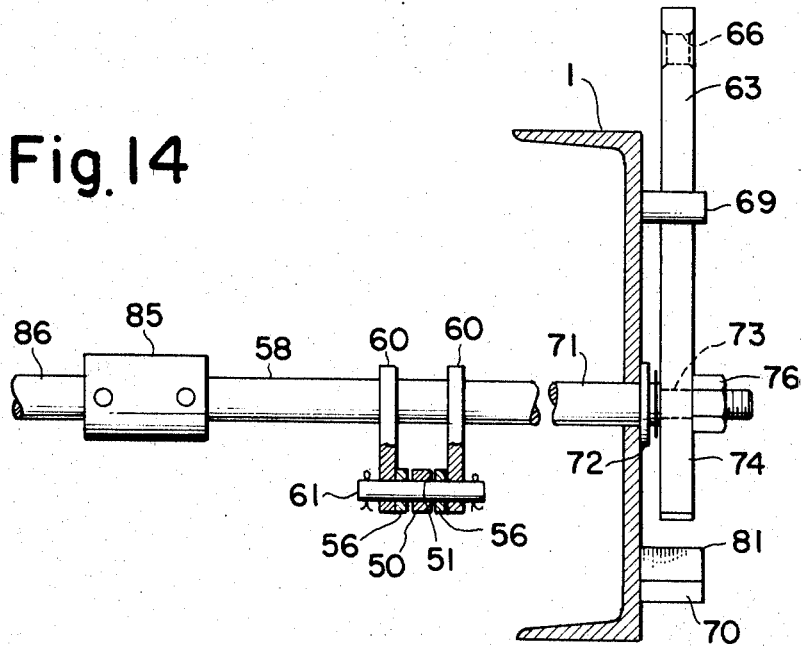
FIG. 14 is a view looking at the left side of the latch operating mechanism.

Refer first to FIG. 1, which is a top plan view of a spreader frame only, less any portion of the latching mechanism. The frame is of rectangular outer configuration, being approximately forty feet long (the size of spreader used when handling forty-foot containers) by eight feet wide, and is formed by suitably welding together two long channel members 1 (which provide the longer sides of the rectangle) and two shorter channel members 2 (which provide the shorter sides of the rectangle), the flanges of all four of these channels facing inwardly. For strengthening purposes, for transversely-extending parallel channel members 3, each of which has the same dimensions as do members 2, are welded at their opposite ends to the respective members 1, members 3 being parallel to members 2 and being spaced approximately eight feet apart. The cross-sectional dimensions of the two members 1, the two members 2, and the four members 3, are exactly the same. For further strengthening, five diagonally-extending, parallel angle members 4 are welded at their opposite ends to the upper faces of the respective members 1, in such a way as to form diagonals for the five approximately equal hollow squares formed by members 1, 2, and 3. At the four top corners of the rectangle, corner plates 5 are welded to the tops of the channels 1 and 2, to two of which plates (to wit, at the upper left and lower right corners of the rectangle, in FIG. 1) the corresponding ends of the two end members 4 are welded.

Refer now to FIG. 2, which is a vertical sectional view illustrating the latching mechanism located at the right-hand front corner of the frame. Speaking generally, at each of the four bottom corners of the rectangular spreader frame a corner plate 6 is welded into the bottom portions of the respective adjacent channel members 1 and 2, these channel members being notched at their bottom corners to accommodate the respective corner plates. Corner plates 6 are somewhat of the same outer configuration as the top corner plates 5, but the former are somewhat larger in area and are made from considerably thicker material. A hole 7 is drilled vertically through each of the corner plates 6, and the lower portion of the cylindrical shank of a spud member 8 passes freely through each respective hole 7, so it may be said that a separate spud member is journaled for rotation in each one of the four corner plates 6. The centers of the holes 7 define the corners of a rectangle which is about thirty-nine feet, four inches (for a forty-foot spreader) by seven feet, five inches. Referring specifically now to FIG 2, the upper portion of the cylindrical shank of spud 8 carries external threads, and a nut 9 engages these threads and bears rather loosely against the upper face of corner plate 6, thereby to prevent the spud 8 from dropping down through the corner plate; a washer 10 is preferably utilized between nut 9 and plate 6. In order to lock the nut 9 in position, a hole 11 is drilled transversely through this nut into its internal threads; hole 11 is tapped and a set screw is mounted therein for engagement with the threads on spud 8.

A pair of arcuate guide members 1 (see FIG. 4) are welded to the underside of corner plate 6, on diametrically-opposite sides of spud 8. Each of the guide members is a section of a solid cylinder, and the pair of guide members functions to assist in guiding the locking spud 8 into a fitting provided on a container being handled. It is pointed out that the spuds 8 are mounted for rotary motion, to effect the desired locking and unlocking action of the latches carried by the spuds.

The bottom end of spud 8 is formed with an integral dog or latch portion 13 (see FIGS. 5 and 6) in the form of a rectangle rounded at its ends, as seen in the top plan view of FIG. 6. In this connection, it is pointed out that FIGS. 5 and 6 depict the spud 8 rotated 90° from its position in FIG. 2. The extreme lower end of spud 8 is formed into a conical but somewhat rounded point, to facilitate entry of the latch portion of the spud into the corner fittings provided on a container being handled.

Now refer to FIG. 7, which is a perspective view of the upper portion of a container 14 to be handled by the spreader of this invention. At each of its four top corners (and also at each of its four bottom corners, although the latter are not illustrated), the metal frame of the container 14 has firmly secured thereto (as by welding) a corner fitting 15, which is of the ASA type (Proposed MH–5 Standard Fitting). Each of the corner fittings 15 is an open box-like housing having in its top wall a rectangular slot 16 whose longer dimension extends parallel to the length of the container 14. It may be seen that each fitting 15 provides a downwardly-facing latching abutment formed by that portion, of the lower face of the top wall of the fitting housing or box, which is located at the longer side edges of the rectangular slot 16 therein. The length of the rectangle 13 of spud 8 is somewhat smaller than the length of the rectangular slot 16 of fitting 15, but is greater than the width of slot 16, so that the latch or dog 13 can pass through slot 16, and then, when the spud 8 is rotated 90° to the "locked" position illustrated in FIG. 2, the dog 13 moves under the aforesaid latching abutment provided by the fitting. Then, when the spreader frame and the spud carried thereby are lifted, the dog 13 engages this abutment to lift the container 14 also. As mentioned, this is the "locked" position of the dog and spud, wherein the container is "locked" to the spreader frame. It will hereinafter become apparent why the spud 8 is illustrated in its "locked" position in FIG. 2; in this "locked" position, of course, the major dimension of the dog 13 extends at right angles to the length of slot 16 and to the length of container 14, and also to the major dimension of the rectangular spreader frame.

It is to be understood that the elements 6 through 13 are duplicated at each of the four bottom corners of the spreader frame. All four of the spuds 8 are rotated simultaneously to either "locked" position (wherein, as stated, the longer dimension of the latching dog 13 extends at right angles to the length of slot 16) or to "unlocked" position (wherein the longer dimension of the latching dog 13 extends parallel to the length of slot 16, and can then freely enter or be withdrawn from this slot). In a first "mechanical" embodiment of the invention, which will now be described, a common manually-operable means is mechanically linked to the spuds 8 in such a way that operation of the means causes simultaneous rotation of all four of the spuds 8 (and, of course, of all four of the dogs 13).

Refer again to FIG. 2. The shank portion of spud 8, the upper end of which portion is threaded and engages nut 9 and the lower end of which portion passes freely through hole 7 in the corner plate 6 and through guides 12, may be about two inches in diameter. At its extreme upper end, spud 8 has a cylindrical portion of smaller diameter (three-fourths inch, for example) which is journaled for rotation within a vertical aperture provided at one end of a bearing plate 17 which extends inwardly from channel member 2 and whose other end is welded to the inner face of member 2. A flat angularly-extending bracket 18 is welded at one end to the upper face of plate 17 and at its opposite end to the inner face of member 2. Thus, spud 8 is journaled for rotation in upper and lower bearings 17 and 6, respectively.

Between its cylindrical upper end portion and its shank portion, spud 8 has a portion 19 of square cross-section (see FIGS. 5 and 6). A horizontally-extending arm 20 (see FIG. 3) has near one end thereof a square hole which matches the square portion of spud 8; this end of arm 20 is firmly secured to the square portion of spud 8, at the lower end of this portion, by means of a set screw mounted in a horizontal hole 21 which is drilled and tapped into communication with the square hole in the arm. The inner end of the set screw bears against one face of the square portion of spud 8. Rotation of arm 20, by a force applied to the opposite end thereof, thus causes rotation of spud 8.

The other end of arm 20 is pivotally mounted at the bifurcated end of a clevis 22, by means of a pin 23 which passes through holes at the ends of the two clevis arms and through a hole in the arm 20. One end of a short stud 24, which is threaded at both ends, is threaded into a tapped hole provided in the base of clevis 22, a jam nut 25 being threaded onto this stud to lock the items 24 and 22 together securely. The other end of stud 24 is threaded into a tapped hole provided in the base of a clevis 26, a jam nut 27 being threaded onto this end of the stud to lock the items 24 and 26 together securely. One end of a stud 28 is flattened, and this end of the stud is pivotally mounted at the bifurcated end of clevis 26, by means of a pin 29 which passes through holes at the ends of the two clevis arms and through a hole in the flattened end of the stud 28.

The double clevis arrangement 26, 22 described enables a linear (longitudinal) movement of stud 28 to cause a rotary movement of arm 20, about a center of rotation located on the longitudinal axis of spud 8. When stud 28 moves toward the left, the arm 20 is made to move counterclockwise, viewed from above as in FIG. 3. The mechanical arrangement previously described entails the result that the arm 20 has a range of travel of 90° of arc, as indicated by the arrow 30 in FIG. 3; the arc described is one-quarter of the circumference of a circle whose center is on the longitudinal axis of spud 8 and whose radius is the horizontal distance between such longitudinal axis and the center of pin 23. It will be realized, from what has gone before, that a 90° rotation of arm 20 produces a 90° rotation of spud 8, from the "locked" position illustrated in FIG. 2 to the "unlocked" position represented in FIG. 5. Thus, when stud 28 moves toward the left in FIGS. 2 and 3 throughout its range of travel, spud 8 rotates from its "locked" or "latching" position to its "unlocked" or "unlatching" position.

The stud 28 extends parallel to the long side channel members 1 of the frame, and passes through a fixed end guide 31 comprising a centrally-bored round bar welded to two longitudinally-spaced flat bracket plates 32 which are in turn welded to the inside of the channel member 1. A grease fitting 33 is mounted in a tapped hole extending through the wall of the round bar portion of guide 31.

The end of stud 28 opposite to the flattened end thereof is threaded, and this threaded end of the stud is rigidly coupled by means of a threaded coupling 34 and a pair of jam nuts 35 and 36 (one threaded on stud 28 and the other threaded on rod 37) to the threaded end of an elongated drive rod 37, which may be termed an intermediate drive rod.

An adjusting nut 38, threaded onto rod 37 slightly to the left of nut 36, serves as an abutment for one end of a compression spring 39 which surrounds drive rod 37. Nut 38 is fastened securely to rod 37 by means of a set screw mounted in a tapped hole 40 whose inner end communicates with the interior of the nut. Thus, the inner end of the aforementioned set screw engages the threads on rod 37. The other end of spring 39 bears against a fixed abutment provided by a plate 41 welded at one end to the inside of channel member 1 and having an aperture at its other end through which rod 37 freely passes. Bracket plate 41 is braced by means of a flat rectangular plate 42 welded along one side edge to plate 41 and welded at one end to the inside of channel 1. The spring 39 is prestressed when the mechanism is in the "locked" position illustrated in FIGS. 2 and 3, by suitable adjustment of nut 38 along rod 37. Thus, in the "locked" position, the spring 39 exerts a force against nut 38 (fixed to rod 37) which urges rod 37 toward the right. When the rod 37 is moved toward the left to "unlock" the latches, the spring 39 is further compressed because abutment 38 moves closer to fixed abutment 41; this means that the spring opposes the motion of the rod in this direction, and the force exerted by the spring must be overcome in order to move the rod. Therefore, when the force moving the rod 37 toward the left is released, spring 39 pushes against nut 38 (the opposite end of the spring reacting on the fixed abutment 41) to move rod 37 and stud 28 (secured to one end of rod 37) to the right, causing rotation of arm 20 and spud 8 to the "locked" position.

FIGS. 8 and 9 correspond, respectively, to FIGS. 2 and 3, except that FIGS. 8 and 9 depict the latching mechanism at the left-hand front corner of the spreader frame, while FIGS. 2 and 3 depict the latching mechanism at the right-hand front corner of the spreader frame. The elements 6 through 13 are duplicated at the left-hand front corner of the spreader frame (as previously stated); also, the elements 17 through 42 are duplicated at the left-hand front corner of the frame. Thus, the description hereinbefore given of the construction and mode of operation of the elements 6 through 13 and 17 through 42 is also applicable to FIGS. 8 and 9, so will not be repeated here; the pertinence of this same description will be appreciated after a study of FIGS. 8 and 9.

Now refer to FIG. 10, which is a simplified schematic showing of the arrangement of the locking gear on the spreader frame. The intermediate drive rod 37 extends from the threaded coupling 34 to a point near the transverse center line of the spreader frame, and extends parallel to the longer side channel members 1, as indicated in FIG. 10. Somewhat (say, about two and one-half feet) to the left of bracket plate 41, rod 37 passes through a guide and supporting means 43 (shown in detail in FIG. 11) comprising a centrally-bored round bar welded at one end of a flat bracket plate 44 whose other end is welded to the inside of channel member 1. Bracket plate 44 is braced by means of a flat rectangular plate 45 welded along one side edge to plate 44 and welded at one end to the inside of channel 1. Proceeding from the first guide means 43 toward the center of the spreader frame, at intervals of a little over four feet apart, two additional guide means 43 are provided for drive rod 37.

At a point near the transverse center line of the spreader, a fixed end guide means 31 is utilized for drive rod 37. This last-mentioned guide means is an exact duplicate of the end guide arrangement 31–33 previously described. It is pointed out at this juncture that the drive rod 37 and the stud 28 secured thereto are free to move back and forth through the various guide means 31, 43.

As indicated in FIG. 10, the drive rod 37 for the left-hand front corner of the frame, like the drive rod 37 for the frame right-hand corner previously described, passes through three spaced guide and supporting means 43 and, near the transverse center line of the spreader, a fixed end guide means 31.

Refer now to FIGS. 12–14, which illustrate the manual operating means for the latch mechanism, at the center of the spreader. The central or inner end of the right-hand drive rod 37 is flattened, and this end of the rod 37 is pivotally mounted at the bifurcated end of a clevis 46, by means of a pin 47 which passes through holes at the ends of the two clevis arms and through a hole in the flattened end of rod 37. The threaded end of a stud 48, which is threaded on only one end, is threaded into a tapped hole provided in the base of clevis 46, a jam nut 49 being threaded onto this stud to lock the items 48 and 46 together securely. The other end of stud 48 is welded to one end of a pad eye 50, which is simply a plate of rectangular configuration having an aperature 51 near the end thereof opposite to the end welded to stud 48.

The central or inner end of the left-hand drive rod 37 is flattened, and this end of the rod 37 is pivotally mounted at the bifurcated end of a clevis 52, by means of a pin 53 which passes through holes at the ends of the two clevis arms and through a hole in the flattened end of rod 37. One end of a short stud 54 (which is similar to studs 24, previously mentioned), which is threaded at both ends, is threaded into a tapped hole provided in the base of clevis 52, a jam nut 55 being threaded onto this stud to lock the items 52 and 54 together securely. The other end of stud 54 is threaded into a tapped hole provided in the base of a clevis 56, a jam nut 57 being threaded onto this end of the stud to lock the items 54 and 56 together securely.

The cylindrical shank of a transversely-extending stub shaft 58 pasess freely through a hole provided in the front channel member 1, the center of this hole preferably lying on the transverse center line of the spreader frame. Stub shaft 58 is journaled for rotation in this hole and also in a central hole provided in a bearing pad 59, of square configuration, which is welded around its edges to the outside of the front channel member 1. A pair of spaced drive arms 60 are secured to shaft 58, these arms extending at right angles to the center line of shaft 58 (and thus parallel to pad eye 50 and to the arms of clevis 56), the shaft passing through a hole at one end of each of the arms 60 and the arms being welded to the shaft at these holes. The two drive arms 60 are located equidistantly, front-to-rear, from the center lines of the studs 48 and 54.

At its outer end, each of the drive arms 60 has a hole, and a long pin 61 pases freely through the holes in the two drive arms, through the holes at the ends of the two arms of clevis 56, and through aperature 51 in pad eye 50, the pin 61 thus pivotally connecting together all of these items. In the "locked" position of the mechanism which is illustrated, a line connecting the centers of the two holes in each of the drive arms 60 lies at an angle of 45° below a horizontal line drawn through the shaft axis, so it can be said that in this position the center lines of these arms lie 45° below the horizontal (see FIG. 14).

When the shaft 58 is rotated 90° clockwise (viewed from the front, as in FIG. 13), the pad eye 50 follows this rotation, and, through the mechanical linkage including clevis 46, causes the right-hand drive rod 37 to move longitudinally toward the left. As previously described, this movement of the right-hand intermediate drive rod 37 causes spud 8 at the right-hand front corner of the spreader frame to rotate to the "unlocked" position.

The rotation of shaft 58 in the clockwise direction also causes rotation of the arms of clevis 56 which, through the mechanical linkage including the double clevis arrangement 56, 52, causes the left-hand drive rod 37 to move longitudinally toward the left. This movement of the left-hand intermediate drive rod 37 causes spud 8 at the left-hand front corner of the speader to rotate to the "unlocked" position.

Outwardly of its cylindrical shank portion and outwardly of bearing pad 59, the stub shaft 58 has a reduced portion 62 of square cross-section. The hub end of a lanyard arm 63 is firmly secured to this square portion of shaft 58; the lanyard arm has a square hole therein which fits onto the square portion 62 of the shaft, and the inner end of a set screw 64 (which is mounted in a tapped hole in arm 63) bears against one face of the square portion 62 of shaft 58. Outwardly of its square portion 62, the stub shaft 58 is provided with threads, and a hex nut 65 engages these threads and bears against the outer face of lanyard arm 63 (a lock washer preferably being interposed between nut 65 and arm 63) to mount arm 63 in position with its inner face engaging the shoulder formed at the junction of the square portion 62 and the cylindrical shank portion of shaft 58.

At its outer end, lanyard arm 63 has a hole 66 therein, and one end of an operating lanyard 67 (made of one-quarter-inch Manila rope, for example) passes through this hole and is secured to the bight of the lanyard, as by means of a bowline knot. The other end of lanyard 67 (which may be approximately four feet in length) is passed through a brass operating ring 68 (which has an I.D. of three inches) and is secured to the bight of the lanyard, as by a bowline knot. By way of example, the distance between the center of the square hole at the hub end of lanyard arm 63 and the center of hole 66 may be twelve inches.

In the "locked" position of the mechanism which is illustrated, the line joining the centers of the two holes in lanyard arm 63 (the center of the square hole at the hub end of this arm, of course, coinciding with the longitudinal axis of shaft 58) lies at an angle of 45° above a horizontal line drawn through the shaft axis, as viewed from the front in FIG. 13. In this position, the upper edge of arm 63 is in engagement with a fixed stop 69 which is welded at its inner end to the outside of channel member 1 and which extends outwardly from this member into the path of travel at arm 63. Assuming for the moment that lanyard arm 63 is free to rotate (how it is releasably locked in position will be hereinafter described), ring 68 may be grasped and manually pulled downwardly in order to rotate lanyard arm 63 (and also shaft 58, secured thereto) in the clockwise direction, viewed from the front as in FIG. 13. From what has gone before, it will be realized that this rotation of arm 63 in the clockwise direction causes rotation of spuds 8 to the "unlocked" position. It will also be remembered that this operation of the mechanism to the "unlocked" position is opposed by the force exerted by springs 39. A fixed stop 70, similar in construction to stop 69 and similarly mounted, is located to enable a 90° rotation of the lanyard arm 63; stop 70 is adapted to come into engagement with the lower edge of the arm 63, to limit the rotation of arm 63 to 90° from the "locked" position illustrated.

The cylindrical shank of a transversely-extending shaft 71 extends entirely across the spreader frame and passes freely through aligned holes provided in the two channel members 1. Shaft 71 is journaled for rotation in these holes and also in central holes provided in two bearing pads 72, of square configuration, which are welded around their edges respectively to the outside of the two channel members 1.

Outwardly of its cylindrical shank portion and outwardly of bearing pads 72, the shaft 71 has at each of its ends a reduced portion 73 of square cross-section. For convenience, the structure at only one of these ends will be described in detail; reference will be made hereinafter to the duplicated structure at the other end. One end of a locking arm 74 is firmly secured to this square portion of shaft 71; the locking arm has a square hole therein which fits onto the square portion 73 of the shaft, and the inner end of a set screw 75 (which is mounted in a tapped hole in arm 74) bears against one face of the square portion 73 of shaft 71. Outwardly of its square portion 73, the shaft 71 is provided with threads, and a hex nut 76 engages these threads and bears against the outer face of locking arm 74 (a lock washer preferably being interposed between nut 76 and arm 74) to mount arm 74 in position with its inner face engaging the shoulder formed at the junction of the square portion 73 and the cylindrical shank portion of shaft 71.

The hub end of lanyard arm 63 is generally cylindrical, but a portion of its periphery is of increased radius, thereby to provide, at the junction between the two different-radii portions, a radial abutment 77 the edge of which, in the illustrated "locked" position of the mechanism, makes an angle of 20° with the vertical plant passing through the center of shaft 58, and which faces toward the left, toward locking arm 74. The end face of locking arm 74, at the end thereof remote from shaft 71, is adapted to engage abutment 77 when the lanyard arm 63 is in the position illustrated, thus preventing clockwise rotation of arm 63. It should be apparent that the arm 63 (and thereby the entire latching mechanism) is then locked in its "locked" position.

The locking arm 74 can be withdrawn from its operative position, that is, from engagement with abutment 77, when it is desired to operate the mechanism to the "unlocked" position. At an intermediate location (between shaft 71 and the abutment-engaging end of arm 74) on locking arm 74, a hole 78 is drilled, and one end of a releasing lanyard 79 passes through this hole and is secured to the bight of the lanyard, as by means of a bowline knot. The other end of lanyard 79 (which is similar to lanyard 67) is passed through a brass releasing ring 80 (similar to ring 68) and is secured to the bight of the lanyard, as by a bowline knot. Ring 80 may be grasped and manually pulled downwardly in order to rotate locking arm 74 and locking shaft 71 in the clockwise direction to withdraw the abutment-engaging end of arm 74 from engagement with abutment 77 on lanyard arm 63. A fixed stop 81, similar in construction to stops 69 and 70, is located a short distance (one inch, for example) below the lower edge of arm 74; stop 81 is adapted to come into engagement with the lower edge of arm 74 when the latter is rotated clockwise from the position illustrated, to limit the amount of rotation of locking arm 74.

One end of a tension spring 82, which normally urges arm 74 in the counterclockwise direction, is fastened to this arm at a location near to hole 78, on the side thereof toward shaft 71. This end of spring 82 is formed with an eye which loops around a bolt 84 threadedly mounted on arm 74. The opposite end of spring 82 is fixedly attached to channel member 1, by means of a bracket 83 welded at its base to the outside of member 1; the outer end of bracket 83 has a hole therein in which a bolt-and-nut combination is mounted, and the eye provided at the said opposite end of spring 82 loops around the last-mentioned bolt.

By means of a coupling 85, the cylindrical or shank end of a shaft 86 (which is similar to shaft 58), but is much longer) is rigidly coupled to the cylindrical inner end of shaft 58. The other end of shaft 86 extends to the opposite or rear long channel member 1 of the frame, and the outer end of said shft extends freely through the rear channel member 1 and through a bearing pad (not shown) welded to the outside of the rear channel member. The outer end of shft 86 has a square portion similar to square portion 62 of shaft 58, and the extreme outer end of shaft 86 carries threads similar to those (engaged by nut 65) on shaft 58. The combination of the coupled operating shafts 58 and 86 (coupled together at 85) extends entirely across the spreader frame; it has previously been stated that the locking shaft 71 extends entirely across the spreader frame, and that the construction at the two ends of shaft 71 are duplicates (referring to the square portions and to the threaded outer ends). At the other or rear side of the spreader frame, a lanyard arm which is an exact duplicate of arm 63 is secured to the square portion of shaft 86, and a locking arm which is an exact duplicate of arm 74 is secured to the square portion at the rear end of shaft 71.

Refer again to FIG. 10. The entire spreader is symmetrical about its longitudinal or major center line 87. Thus, the elements 6 through 13, 17 through 57, 59 through 70, and 72 through 84, which have previously been described in connection with the forward side of the spreader, are all duplicated at the aft side of the spreader, in mirror image fashion. All four corner latches (or spuds) are therefore operable simultaneously by the manually-operable mechanism at the center of the long forward side of the spreader (which latter includes the lanyard arm 63, the locking arm 74, etc.), and since this latter mechanism is duplicated at the center of the long aft side of the spreader, all four of the corner latches of the spreader may be operated simultaneously from the center of either of the longer sides of the frame, at will.

Figure 15:
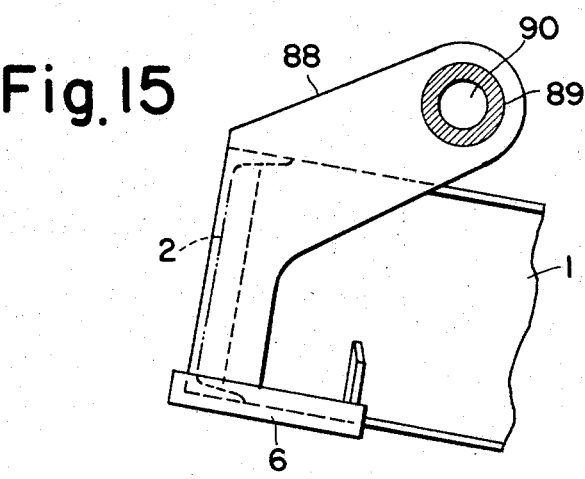
FIG. 15 is a sectional view taken on lines 15—15 of FIG. 1.

Refer now to FIGS. 1 and 15. At each of the four corners of the frame, a lifting pad 88 is welded to the respective bottom corner plate 6, the respective top corner plate 5, the adjacent short channel member 2, and the adjacent long channel member 1. Each of the lifting pads projects upwardly above the top of the frame (see FIG. 15), and looking downwardly from above the frame (as in FIG. 1), each lifting pad extends from its respective fram corner in a direction toward the center of the frame, the vertical midplane of each pad making an angle of approximately 9° with the long channel members 1. From the bottom corner plate 6, each lifting pad 88 extends upwardly and then inwardly as wall as upwardly, as depicted in FIG. 15. At its upper (inner) end (which end, as previously noted, is above hte top of the spreader frame), each lifting pad has a large hole therethrough, in which is welded a short piece of round bar 89, and these pieces of bar, in turn, each have a hold 90 drilled therethrough for reception of an anchor shackle pin.

Refer now to FIG. 16, which is a somewhat diagrammatic front elevation of a container being handled by the spreader of this invention. Anchor shackles 91 (two of which are illustrated in FIG. 16, those at the two forward corners of the spreader) are pinned to each of the four lifting pads 88, one shackle at each of the four corners of the spreader. The spreader is denoted generally by numeral 92. A container 14 being handled is located below the spreader 92, the container being locked or latched to the spreader by means of the latching arrangement previously described, including the four corner spuds 8 (not shown in FIG. 16). The four free ends of the wire ropes 93 of two "Adjust-a-Leg" slings 94 are attached one to each respective one of the four anchor shackles 91, at the corners of the spreader 92. The eyes or lifting loops 95 of the two slings 94 are slipped over a double cargo hook (not shown), which may be of the so-called rams'-horn type and which comprises the lifting element of a ship's crane.

The "Adjust-a-Leg" slings 94 provide an arrangement for equalizing the load, that is, for adjusting the single point of suspension of the frame-plus-container load (which point of suspension is delineated by the cargo hook) to vertical alignment with the center of gravity of the total load, if such center of gravity is displaced from the geometrical or spatial center of the load.

Alternatively, instead of the "Adjust-a-Leg" slings shown, a load equalizer such as disclosed in the copending Wilkie application, Ser. No. 585,080, filed Oct. 7, 1966, may be used for coupling the spreader 92 to the cargo hook; the Wilkie apparatus performs an equivalent load equalizing function.

A description of the operation of the previously-described first embodiment of the invention will now be given. By operation of the ship's crane, the cargo hook, with the spreader 92 suspended therefrom in the manner just described, is lowered to the container to be handled, which is assumed to be resting on a trailer on the pier. An operator (e.g., a longshoreman) on the pier releases the lock of the mechanism by grasping ring 80 and pulling downwardly. This pulls the locking arm 74 downwardly (against the bias of spring 82), out of engagement with abutment 77 on the lanyard arm 63. When the arm 74 rotates, shaft 71 is rotated to release the duplicated locking arm at the far side of the spreader (i.e., the side opposite to the one where the operator is located); in this connection, it is noted that the mechanism may be operated from either the forward or the aft side of the spreader.

After pulling the releasing lanyard 79 in this manner (it may be pulled until locking arm 74 engages its stop 81), the pier-side operator grasps ring 68 and pulls the operating lanyard 67 downwardly, while holding onto ring 80. This rotates lanyard arm 63 and through shafts 58 and 86 rotates the duplicate lanyard arm at the far side of the spreader. As previously described, the rotation of arm 63 and shaft 58 in the clockwise direction (against the bias of springs 39) rotates the four corner spuds 8 to their "unlocked" positions, bringing their latch portions 13 to positions suitable for insertion into the slots 16 in the four corner castings 15 of the container (FIG. 7). Lanyard 79 may be released after arm 63 begins to rotate.

Then, the crane operator lowers the spreader. When the latch portions 13 of the spuds 8 are within the container casting slots 16, the operator on the pier releases the operating lanyard 67; the lanyard arm then rotates counterclockwise to its original, "locked" position as a result of the driving force supplied by the compression springs 39. The spreader thus locks itself to the container when lanyard 67 is released, due to the force stored in the springs 39.

For release of the container from the spreader, the spreader is unlocked by pulling first the releasing lanyard 79 and then the operating lanyard 67, following which the crane operator lifts the spreader until the spud latch portions 13 move out of the slots 16 in the container corner castings.

It is pointed out that the embodiment of this invention previously described provides a positive locking action. Even if one of the drive rods 37 breaks (at some point closer to the center of the spreader than the adjusting nut 37), or if the operating shaft 58, 86 breaks, the mechanism remains in the "locked" position illustrated, due to the force exerted by the springs 39.

Referring again to FIG. 1, a guard or protecting arrangement is provided for the manually-actuatable operating mechanism (including arms 63, 74, etc.) which is located on the outsides of the two long channel members 1. At the forward side of the frame, a pair of spaced, parallel vertically-extending channel members 96 and 97 are welded, toes or flanges in, to the outside of channel member 1, on opposite sides of the transverse center line of the frame, member 96 being located seventeen inches to the right of such center line and member 97 being located fifteen inches to the left of such center line. The channel members 96 and 97 may be six-inch-by-three-inch channel, eleven inches long, whereas the long channel members 1 may be twelve-inch-by-three-inch channel. At the aft side of the frame, duplicate channel members 96 and 97 are provided in similar locations, for guarding or protecting the duplicate manually-actuatable operating mechanism located at this side of the frame.

An overhead protector is provided, for protecting the centrally-located elements of the drive assembly from damage from above (for example, from damage that could result when one of the slings 94 comes down onto the spreader). A plate 102 is flanged so that it resembles a channel in cross-section; one end of this plate is welded (flanges pointing downwardly) to the inside of one long channel member 1, adjacent the top thereof, and the opposite end of this plate is welded to the inside of the other channel member 1, adjacent the top thereof. Plate 102 is located adjacent the center of the longer sides of the frame.

Six aligning bars, each denoted generally by numeral 98, are securely attached to the outside of the frame and extend downwardly therefrom, these bars functioning to engage the sides of the container as the spreader is lowered thereover and to "nudge" the spreader in one direction or another, as required to assure accurate lateral alignment of the spreader with the container. One of these aligning bars is located at the center of each of the two shorter sides of the frame, one is located adjacent each of the two ends of the right-hand short channel member 3, and one is located adjacent each of the two ends of the left-hand short channel member 3.

Refer now to FIGS. 17 and 18, which are respectively a front elevation and a side view of one of the aligning bars 98, for example the one located at the center of the right-hand shorter side of the frame. The six aligning bars are all exactly the same in construction, and the construction illustrated in FIGS. 17 and 18 is typical of all the bars. A pair of spaced, parallel plates 99 are welded to the outside of channel member 2 to serve as spacers, one of these plates being welded near the top and one near the bottom of the channel. A channel member 100 (for example, a piece of six-inch-by-three-inch channel, two and one-fourth feet in length and having its ends beveled at 45° angles) is bolted at one end to the outside of channel member 2, the bolts passing through the spacers 99 and channel member 2. The free end of member 100 projects downwardly below the bottom of channel member 2. A flat plate 101 is welded across the lower beveled end of channel 100.

FIG. 18 illustrates one end of a spreader frame which has been lowered onto a container 14, prior to lift-off. The downwardly-projecting portion of one or more of the channel members 100 can come into contact with the adjacent side of the container 14, to "nudge" the spreader in one direction or another so as to properly center the spreader over the container. When the spreader is lowered onto the container, guide members 12 pass through the respective slots 16 in the container corner castings 15, and the lower corner plates 6 come into engagement with the upper surfaces of these castings, as illustrated in FIG. 18. When lift-off occurs thereafter, the guide members 12 are lifted partially out of the slots 16, and the latch portions 13 of the spuds 8 (when the latter have been returned to their "locked" positions) come into engagement with the downwardly-facing abutments provided in the container corner castings, as previously described.

The detailed description up to this point has covered a first mechanically-actuated embodiment of the invention, wherein a positive locking action is provided (due to the biasing of the mechanism to its "locked" position, by the compression springs 39, and wherein the mechanism is actuatable from either the forward side or the aft side of the spreader. There will next be described a second mechanically-actuated embodiment, wherein there is no positive locking action, and wherein the mechanism is actuatable from only one side of the spreader. In the description of this second embodiment, elements the same as those previously described will be denoted by the same reference numerals, while elements analogous to (but slightly different in construction from) those previously described will be denoted by the same reference numerals but with prime designations.

The frame construction utilized for the second embodiment is exactly the same as that (see FIG. 1) utilized for the first embodiment, previously described, and includes apertured lower corner plates 6 at each of the four bottom corners of the frame. See FIG. 19, which is a schematic representation generally similar to FIG. 10 but illustrating the arrangement of the locking gear on the spreader frame, in the embodiment now being described. It will be understood that the spreader frame utilized for the second embodiment also includes lifting pads 88 (FIG. 15) and aligning bars 98 (FIGS. 17–18), although these are not shown in FIG. 19.

At the right-hand forward or front corner of the frame, there is utilized a spud member 8', and the lower portion of the cylindrical shank of this spud member passes through the hole 7 in the corresponding lower corner plate 6. See FIG. 20. The spud member 8' is generally similar in construction to spuds 8 previously described, with the exception that it is some two and one-fourth inches longer than spuds 8, the excess length of spud 8' being entirely taken up by the portion 19' of square cross-section, which is two and one-fourth inches longer than the corresponding portions 19 of spuds 8.

The dog or latch portion 13 of spud 8' is illustrated in the "unlocked" position in FIG. 20; in this "unlocked" position the major dimension of the dog 13 extends parallel to the major dimension of the rectangular spreader frame (and also, of course, parallel to the length of slot 16 and to the length of container 14; see FIG. 7).

At the lower end of the square portion 19' of spud 8', one end of a lower arm 20a (which has a square hole therein, matching portion 19') is secured. Arm 20a is similar in construction to arm 20, described previously. One end of a rigid spacer 103 (for example, a piece of pipe) is welded to the upper face of arm 20a, and the other end of this spacer (which surrounds spud portion 19') is welded to the lower face at one end of an upper arm 20b, which latter is similar in construction to arm 20 and which is secured at this one end to the upper end of square portion 19'. Thus, arms 20a and 20b are secured together, and both of these arms are secured at one end to the square portion 19' of spud 8'. Rotation of arm 20b in the clockwise direction (viewed from above, as in FIG. 21) causes rotation of spud 8' toward the "locked" position.

The other end of upper arm 20b is pivotally mounted at the bifurcated end of clevis 22 by means of pin 23. One end of stud 24 is securely attached to the base of clevis 22, and the other end of this stud is securely attached to the base of clevis 26. One end of stud 28 is welded to one end of a pad eye 50, and pin 29 passes through the hole at the other end of this pad eye to pivotally mount the pad eye at the bifurcated end of clevis 26.

The double clevis arrangement 26, 22 enables a linear (longitudinal) movement of stud 28 to cause a rotary movement of upper arm 20b. When stud 28 moves toward the right, the arm 20b is made to move clockwise, viewed from above as in FIG. 21. The arm 20b has a range of travel of 90° of arc, as indicated by the arrow 30' in FIG. 21. A 90° rotation of arm 20b produces a 90° rotation of spud 8', from the "unlocked" position illustrated in FIG. 20 to the "locked" position. Thus, when stud 28 moves toward the right throughout its range of travel, spud 8' rotates from its "unlocked" or "unlatching" position to its "locked" or "latching" position. In the latter position, the major dimension of dog 13 would extend at right angles to the length of slot 16 (FIG. 7) and to the major dimension of the rectangular spreader frame.

Refer again to FIG. 19. Stud 28 passes through an end guide 31 which is welded to the front long channel member 1, and the end of this stud opposite pad eye 50 is coupled at 34 to one end of the intermediate drive rod 37. Drive rod 37 extends from coupling 34 to a point near the transverse center line of the spreader 92', in a direction parallel to the front longer side channel 1. Rod 37 passes through three spaced guide and supporting means 43 and then, near the transverse center line of the spreader and near the other end of the rod, through a fixed end guide means 31. The arrangement of these various guide means is quite similar to that described hereinabove in connection with FIG. 10.

Refer now to FIGS. 20 and 21. The end of lower arm 20a opposite to spud 8' is pivotally mounted at the bifurcated end of a clevis 104, by means of a pin 105 which passes through holes at the ends of the two clevis arms and through a hole in the arm 20a. One end of a short stud 106, which is threaded at both ends, is threaded into a tapped hole provided in the base of clevis 104, a jam nut (not shown) being threaded onto this stud to lock the items 106 and 104 together securely. The other end of stud 106 is threaded into a tapped hole provided in the base of a clevis 107, a jam nut 108 being threaded onto this end of the stud to lock the items 106 and 107 together securely. One end of a stud 109 is welded to one end of a pad eye 50, and a pin 110 passes through the hole at the other end of this pad eye to pivotally mount the pad eye at the bifurcated end of clevis 107.

Since the arm 20a is secured to arm 20b, as well as to spud 8', a movement of drive rod 37 and stud 28 toward the right (resulting in a rotation of arm 20b in the clockwise direction 30', as previously stated) results in a rotary movement of arms 20a, about a center of rotation located on the longitudinal axis of spud 8'. When stud 28 moves toward the right, the arm 20a is made to move clockwise, viewed from above as in FIG. 21. The arm 20a has a range of travel of 90° of arc, as indicated by the arrow 30" in FIG. 21. The double clevis arrangement 104, 107 described converts a rotary movement of lower arm 20a to a linear (longitudinal) movement of stud 109. When arm 20a rotates in the clockwise direction 30", the stud 109 is caused to move upwardly in FIG. 21, i.e., toward the rear of the spreader frame. This movement of stud 109 produces a rotation (to the "locked" position) of a spud 8 located at the right-hand rear corner of the spreader, as will now be described.

Refer again to FIG. 19. Stud 109 extends parallel to the shorter channel members 2 of the frame. Stud 109, like stud 28 previously described, passes through an end guide 31 (which, in the case of the former, is welded to the right side short channel member 2), and the end of stud 109 opposite pad eye 50 is coupled at 34 to one end of a short intermediate drive rod 111. The rod 111 also extends parallel to the shorter channel members 2 of the frame, and the other end of this rod is coupled at 34 to one end of a duplicate stud 109 which passes through an end guide 31 fastened to the right side channel member 2 near the right-hand rear corner of the frame.

Rearwardly of the rear end guide 31, the other end of the duplicate stud 109 is coupled (via pin 105) through a double clevis arrangement to one end of an arm 20c located at the right-hand rear corner of the frame (see also FIGS. 22 and 23). The double clevis arrangement intercoupling the duplicate stud 109 and arm 20c is preferably an exact duplicate of the double clevis arrangement 104, 107 which intercouples arm 20a and stud 109, at the right-hand front corner of the frame. However, the double clevis arrangement at the rear corner of the frame is somewhat reversed in concept from that at the front corner of the frame, since at the rear corner the stud drives the arm 20c, instead of the arm driving the stud 109, as at the front corner.

At the right-hand rear corner of the frame, a spud member 8 is mounted in a hole 7 in the bottom corner plate 6 at this corner. The end of arm 20c opposite to the end which is coupled via pin 105 to the clevis 104 is secured to the square portion 19 of spud 8. The dog or latch portion 13 of spud 8 is illustrated in the "unlocked" position in FIG. 22, consistent with the showing in FIG. 20.

The double clevis arrangement at the rear corner of the frame enables a linear (longitudinal) movement of the first-mentioned stud 109 (transmitted, of course, to duplicate stud 109, which is rigidly coupled thereto via rod 111) to cause a rotary movement of arm 20c, about a center of rotation located on the longitudinal axis of spud 8. When the right-hand studs 109 move toward the rear of the frame, the arm 20c is made to move clockwise, viewed from above as in FIG. 23. The arm 20c has a range of travel of 90° of arc, as indicated by the arrow 30''' in FIG. 23. A 90° rotation of arm 20c produces a 90° rotation of spud 8 at the right-hand rear corner of the frame, from the "unlocked" position illustrated in FIG. 22 to the "locked" position. Thus, when drive rod 37 and stud 28 move toward the right, spud 8' at the right-hand front corner of the frame, and also spud 8 at the right-hand rear corner of the frame, move from their "unlocked" positions to their "locked" positions.

The mechanical arrangement at the left-hand front corner of the frame, illustrated in FIGS. 24 and 25, is quite similar to that at the right-hand front corner, previously described. Therefore, FIGS. 24 and 25 are simplified, fragmentary views which illustrate mainly the orientation of the arms 20a and 20b at the left-hand front corner of the frame. The various mechanical linkages are the same as described in connection with FIGS. 20 and 21.

At the left-hand front corner of the frame, a spud 8' is mounted in hole 7 in the bottom plate 6 at this corner. One end of upper arm 20b is firmly secured to the upper end of square portion 19' of spud 8', and rotation of arm 20b in the clockwise direction (as viewed from above) through the 90° of arc indicated by arrow 30' (FIG. 25) causes rotation of spud 8' at this corner to the "locked" position.

The other end of arm 20b is coupled (via pin 23) through a double clevis linkage (which is exactly similar to the double clevis arrangement 26, 22 previously described in connection with FIG. 20) to a duplicate stud 28 which passes through an end guide 31 (FIG. 19) and is coupled at 34 to one end of another intermediate drive rod 37. This last-mentioned drive rod 37 extends from the left front coupling 34 to a point near the transverse center line of the spreader 92', passing through three spaced guide and supporting means 43 and then, near such center line and near the other end of the rod, through a fixed end guide means 31.

At the left-hand front corner of the frame, one end of lower arm 20a is secured to the lower end of square portion 19' of spud 8'. The other end of arm 20a is coupled (via pin 105) through a double clevis linkage (which is exactly similar to the double clevis arrangement 104, 107 previously described in connection with FIG. 21) to a duplicate stud 109 which passes through an end guide 31 (FIG. 19) and is coupled at 34 to one end of another short intermediate drive rod 111. Both the drive rod 111 and the duplicate stud 109 just mentioned extend parallel to the shorter channel members 2 of the frame. The last-mentioned end guide 31 is welded to the left side short channel member 2. The last-mentioned drive rod 111 extends from the left side coupling 34 to a point near the left rear corner of the spreader 92', at which point its other end is coupled by means of another coupling 34 to one end of another stud 109. This last-mentioned stud 109 passes through an end guide 31 fastened to the left side channel member 2 near the left-hand rear corner of the frame.

Rearwardly of the rear end guide 31 just mentioned, the other end of the last-mentioned stud 109 is coupled (via pin 105) through a double clevis linkage or arrangement to one end of another arm 20c located at the left-hand rear corner of the frame (see also FIGS. 26 and 27). The double clevis arrangement intercoupling the last-mentioned stud and the other arm 20c is preferably an exact duplicate of the double clevis linkage 104, 107 which intercouples arm 20a and stud 109, at the left-hand front corner of the frame. However, here again the double clevis arrangement at the rear corner of the frame is somewhat reversed in concept from that at the front corner of the frame, since at the rear corner the stud drives the arm 20c, instead of the arm driving the stud 109, as at the front corner.

At the left-hand rear corner of the frame, a spud member 8 is mounted in a hole 7 in the bottom corner plate at this corner. The end of arm 20c opposite to the end which is coupled via pin 105 to the clevis 104 is secured to the square portion 19 of this last-mentioned spud. The dog or latch portion 13 of this last-mentioned spud 8 is illustrated in the "unlocked" position in FIG. 26, consistent with the illustration in FIG. 20.

At the left-hand front corner of the frame, arms 20a and 20b rotate together, so that a movement of the left-hand drive rod 37 toward the right rotates arm 20b at this corner in the clockwise direction 30' (FIG. 25) and rotates arm 20a at this corner in the clockwise direction 30", the range of travel of both arms being 90° of arc. The double clevis arrangement 104, 107 at the left-hand front corner of the frame converts a rotary movement of the left-hand lower arm 20a to a linear (longitudinal) movement of the left-hand front stud 109. When this last-mentioned arm 20a rotates in the clockwise direction 30", the left-hand front stud is caused to move toward the rear of the spreader frame.

The double clevis linkage at the left-hand rear corner of the frame enables a linear (longitudinal) movement of the left-hand front study 109 (transmitted, of course, to the left-hand rear stud 109, which is rigidly coupled thereto via the left-hand rod 111) to cause a rotary movement of the left-hand arm 20c. When the left-hand studs 109 move toward the rear of the frame, the left-hand arm 20c is made to move clockwise, viewed from above as in FIG. 27. The left-hand arm 20c has a range of travel of 90° of arc, as indicated by the arrow 30''' in FIG. 27. A 90° rotation of arm 20c produces a 90° rotation of spud 8 at the left-hand rear corner of the frame from the "unlocked" position illustrated in FIG. 26 to the "locked" position. Thus, when the left-hand drive rod 37 and the left-hand stud 28 move toward the right, spud 8' at the left-hand front corner of the frame, and also spud 8 at the left-hand rear corner of the frame, move from their "unlocked" positions to their "locked" position.

The two drive rods 37 are caused to move back and forth (toward the right from the position illustrated, for "locking", and toward the left from the "locking" position, for "unlocking") by a manual operating means located in the vicinity of the transverse or minor center line of the spreader; this operating means will now be described.

Figure 28:
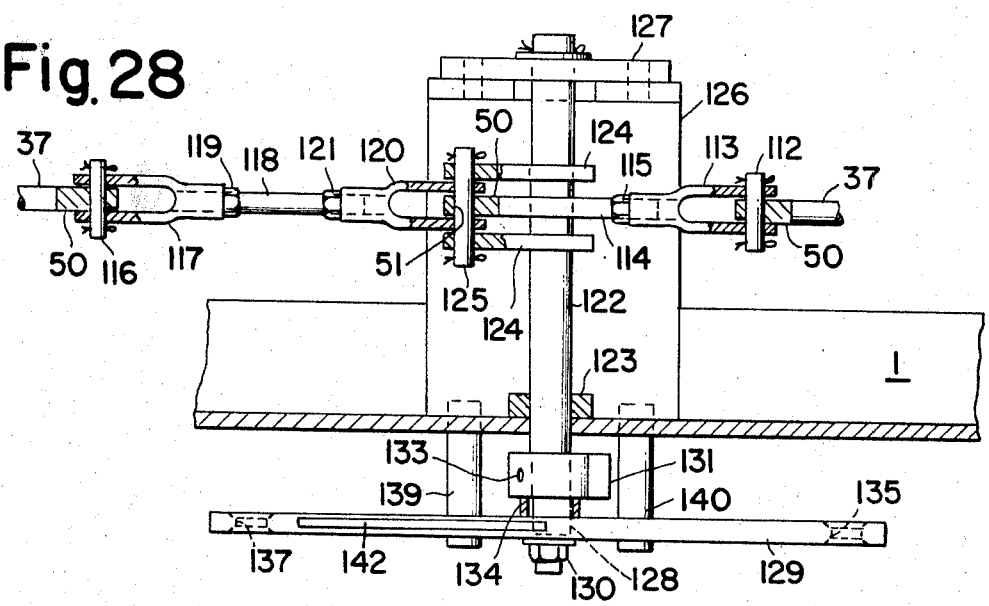
FIG. 28 is a plan view of the operating mechanism for the latches, according to the second embodiment.
Figure 29:
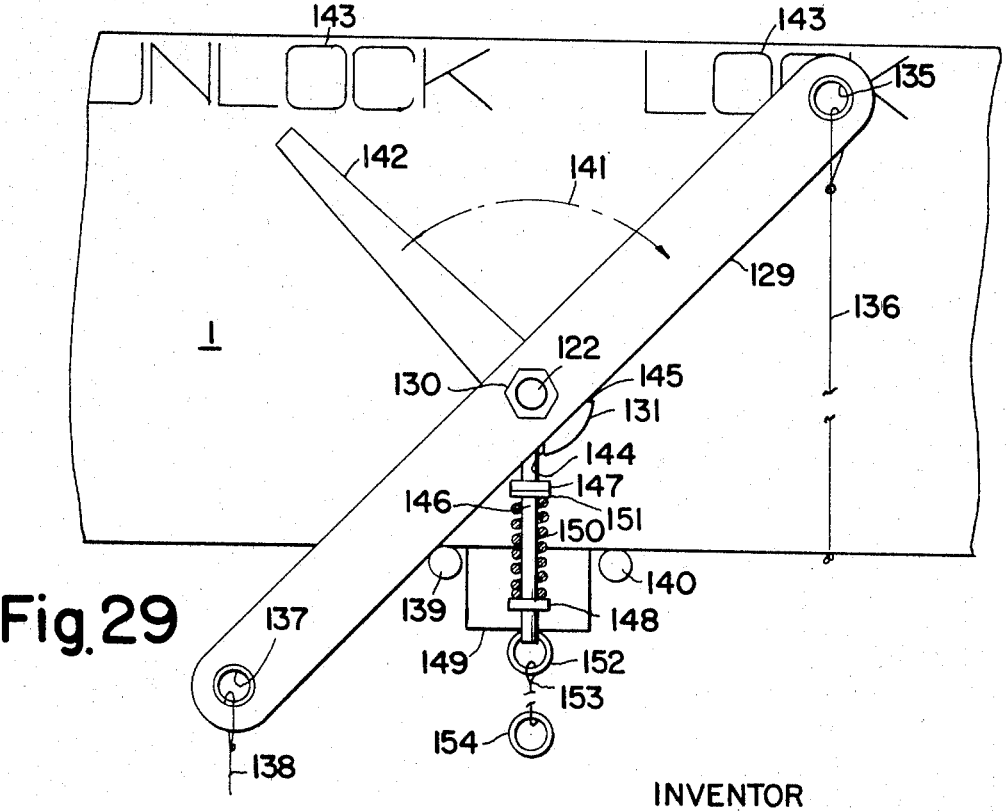
FIG. 29 is a front elevation of the mechanism of FIG. 28.

Refer now to FIGS. 28–30. One end of a pad eye 50 is welded to the central or inner end of the right-hand drive rod 37, and a pin 112 passes through the hole at the other end of this pad eye and through holes at the ends of two clevis arms, to pivotally mount this pad eye at the bifurcated end of a clevis 113. The threaded end of a stud 114, which is threaded on only one end, is threaded into a tapped hole provided in the base of clevis 113, a jam nut 115 being threaded onto this stud to lock the items 114 and 113 together securely. The other end of stud 114 is welded to one end of a pad eye 50.

One end of another pad eye 50 is welded to the central or inner end of the left-hand drive rod 37, and a pin 116 passes through the hole at the other end of this pad eye and through holes at the ends of two clevis arms, to pivotally mount this pad eye at the bifurcated end of a clevis 117. One end of a short stud 118, which is threaded at both ends, is threaded into a tapped hole provided in the base of clevis 117, a jam nut 119 being threaded onto this stud to lock the items 117 and 118 together securely. The other end of stud 118 is threaded into a tapped hole provided in the base of a clevis 120, a jam nut 121 being threaded onto this end of the stud to lock the items 118 and 120 together securely.

The cylindrical shank of a transversely-extending stub shaft 122 passes freely through a hole provided in the front channel member 1, the center of this hole preferably lying on the transverse or minor center line of the spreader frame. Stub shaft 122 is journaled for rotation in this hole and also in a central hole provided in a bearing pad 123, of square configuration, which is welded around its edges to the inside of the front channel member 1. A pair of spaced drive arms 124 are secured to shaft 122, these arms extending at right angles to the center line of shaft 122 (and thus parallel to the pad eye 50 at the end of stud 114 and to the arms of clevis 120), the shaft passing through a hole at one end of each of the arms 124 and the arms being welded to the shaft at these holes. The two drive arms 124 are located equidistantly, front-to-rear, from the center lines of the studs 114 and 118.

At its outer end, each of the drive arms 124 has a hole, and a long pin 125 passes freely through the holes in the two drive arms, through the holes at the ends of the two arms of clevis 120, and through aperture 51 in pad eye 50, the pin 125 thus pivotally connecting together all of these items. In the "unlocked" position of the mechanism which is illustrated, a line connecting the centers of the two holes in each of the drive arms 124 lies at an angle of 45° above a horizontal line drawn through the shaft axis, so it can be said that in this position the center lines of these arms lie 45° above the horizontal (see FIG. 30).

When the shaft 122 is rotated 90° clockwise (viewed from the front, as in FIG. 29), the pad eye 50 follows this rotation, and, through the mechanical linkage including clevis 113, causes the right-hand drive rod 37 to move longitudinally toward the right. As previously described, this movement of the right-hand intermediate drive rod 37 causes spud 8' at the right-hand front corner of the spreader frame, and also spud 8 at the right-hand rear corner of the frame, to rotate to the "locked" position.

The rotation of shaft 122 in the clockwise direction also causes rotation of the arms of clevis 20 which, through the mechanical linkage including the double clevis arrangement 120, 117, causes the left-hand drive rod 37 to move longitudinally toward the right. This movement of the left-hand intermediate drive rod 37 causes spud 8' at the left-hand front corner of the spreader frame, and also spud 8 at the left-hand rear corner of the frame, to rotate to the "locked" position.

The longer side of an angle member 126 (for example, an eight-inch-by-four-inch angle) is welded at its end to the inside of the front channel member 1, so that member 126 extends toward the rear from the front member 1 (FIG. 30). The shorter side of member 126 is cut into a U-shape, viewed from the front as in FIG. 29, and the inner cylindrical end of shaft 122 passes between the arms of this U. A bearing pad 127 is secured (as by bolts passing through holes in the respective arms of the U and through holes in the pad) to the inner face of the U, and this pad has a central hole through which the inner end of shaft 122 passes and in which it is journaled.

Outwardly of its cylindrical shank portion and outwardly of front channel member 1, the stub shaft 122 has a reduced portion 128 of square cross-section. The center of a lanyard arm (bar) 129 is mounted at the outer end of this square portion of shaft 122; the lanyard arm has a square hole at its center which fits onto the square portion 128 of the shaft. Outwardly of its square portion 128, the stub shaft 122 is provided with threads, and a hex nut 130 engages these threads and bears against the outer face of lanyard arm 129 (a lock washer preferably being interposed between nut 130 and arm 129).

Inwardly of arm 129, and between this arm and the outside of front channel member 1, a locking member 131 (to be further referred to hereinafter) is firmly secured to the square portion 128 of shaft 122; member 131 has a square hole 132 therein (see FIG. 31) which fits onto the square portion of the shaft, and the inner end of a set screw (which is mounted in a tapped hole 133 in member 131) bears against one face of the square portion 128 of shaft 122. A short spacer member 134 (for example, a piece of pipe) surrounds shaft 122 and is positioned between the inner face of arm 129 and the outer face of member 131. By tightening nut 130 to force arm 129 against spacer 134 and the latter against member 131 (which is secured to shaft 122), arm 129 may be held in its proper position longitudinally of the shaft.

At its right-hand end, lanyard arm 129 has a hole 135 therein, and one end of an operating lanyard 136 (made of one-half inch Manila rope, for example) passes through this hole and is secured to the bight of the lanyard, as by means of a bowline knot. At its other end, lanyard 136 (which may be three feet in length) has an overhand knot, which may be grasped. It may be seen that, when lanyard 136 is pulled downwardly, arm 129 (assuming for the moment that it is free to rotate) is rotated in the clockwise direction about its center on the axis of shaft 122, causing rotation of this shaft in the clockwise direction and a resultant movement of the latching mechanism toward the "locked" position.

At its left-hand end, arm 129 has a hole 137 therein, and one end of an operating lanyard 138 (similar to lanyard 136) passes through this hole and is secured to the bight of the lanyard, as by means of a bowline knot. Lanyard 138, like lanyard 136, has a knot at its lower end which may be grasped. Assuming that arm 129 is in the position corresponding to the "locked" position of the mechanism, and also assuming that it is free to rotate, a downward pull on lanyard 138 causes arm 129 to rotate in the counterclockwise direction, causing rotation of shaft 122 in the counterclockwise direction and a resultant movement of the latching mechanism toward the "unlocked" position. By way of example, the distance between the centers of holes 135 and 137 may be eighteen inches.

In the "unlocked" position of the mechanism which is illustrated, the line joining the centers of the two lanyard holes in arm 129 lies at an angle of 45° above a horizontal line drawn through hole 137, as viewed from the front in FIG. 29. In this position, the lower edge of arm 129 is in engagement with a fixed stop 139 which is welded at its inner end to the bottom of front channel member 1 and which extends outwardly from this member into the path of travel arm 129. A fixed stop 140, similar in construction to stop 139 and similarly mounted, is located to enable a 90° rotation of lanyard arm 129, as indicated by arrow 141; stop 140 is adapted to come into engagement with the lower edge of the arm 129, to limit the rotation of arm 129 to 90° from the "unlocked" position illustrated.

An elongated indicator 142, made from a piece of flat bar stock, cooperates with indicia 143 to indicate the position of the mechanism. One end of indicator 142 is welded to the upper edge of lanyard arm 129 at the center thereof, and this indicator extends at right angles to the line joining the centers of the holes 135 and 137. In the "unlocked" position of the mechanism illustrated, indicator 142 extends upwardly and to the left (viewed as in FIG. 29) from the axis of shaft 122. The indicia 143 comprises the words "Unlock" and "Lock," which are lettered on the outside of the front channel member 1 near the top thereof, in such positions that the centers of the respective words are located symmetrically with respect to the vertical plane passing through the axis of shaft 122, one word on each side of this plane. The word "Unlock" is to the left of this plane, such that the pointer 142 points thereto in the "unlocked" illustrated position of the mechanism and of arm 129. The word "Lock" is to the right of the vertical plane passing through the axis of shaft 122. When arm 129 rotates 90° clockwise as at 141 (which rotation, as previously described, moves the mechanism to the "locked" position), indicator 142 extends upwardly and to the right from the axis of shaft 122, and then points to the word "Lock."

A releasable locking means for the shaft 122 is provided, for releasably locking this shaft at either end of its 90° range of rotation. This locking means will now be described, with reference to FIG. 31.

The locking member 131 is approximately cylindrical in outer configuration, but has in its outer periphery two L-shaped notches 144 and 145 which are centered on lines spaced 90° apart around the circumference of this member. One edge of each of these notches (to wit, the vertically-extending edge of notch 144 in FIG. 31, and the horizontally-extending edge of notch 145, in this same figure) provides an abutment.

The upper end of an elongated vertically-extending plunger 146 is adapted to enter the notches 144 and 145 and to engage the aforementioned edge abutments to prevent rotation of member 131 (and also of shaft 122, to which member 131 is rigidly fastened). In the position of member 131 illustrated in FIGS. 29 and 30, the plunger 146 engages the edge abutment of notch 144 and prevents clockwise rotation of member 131 and of shaft 122; in the other position of member 131 (i.e., when the mechanism has been rotated to "locked" position) plunger 146 would engage the edge abutment of notch 145 to prevent counterclockwise rotation of member 131 and of shaft 122. Plunger 146 is secured against sidewise movement (in the direction of the length of channel member 1), so that it can effect the aforementioned locking of member 131, but can be moved in the direction of its own length so that it can be withdrawn from notches 144 and/or 145, as desired.

Plunger 146 is mounted in position (with its longitudinal center line in a vertical plane passing through the axis of shaft 122) by means of an upper pad eye 147 and a lower pad eye 148, the plunger passing freely through the aligned holes in the outer ends of these two pad eyes. The inner end of pad eye 147 is welded to the outside of the front channel member 1, and the inner end of pad eye 148 is welded to the outside of one leg of a short angle-shaped support 149 the other leg of which is welded to the bottom flange of front channel member 1 (see FIG. 30). A compression spring 150 surrounds plunger 146 and resiliently biases plunger 146 toward its "home" position within notch 144 or notch 145; the lower end of this spring bears against the upper face of pad eye 148 and the upper end of this spring bears against the lower face of a washer 151 which is tack welded to plunger 146 at a location somewhat below the lower face of pad eye 147. The lower face of pad eye 147 then serves as a limit stop for upward movement of plunger 146, when the upper face of washer 151 comes into contact with the lower face of this pad eye.

For manual operation of plunger 146, a brass ring 152 passes through a transverse hole drilled through the lower end of the plunger, this ring carrying a jack chain 153 (some three feet in length) to the lower end of which is secured a ring 154.

A description of the operation of the second embodiment of the invention will now be given. Assume that the latches are in the "unlocked" position illustrated. The cargo hook, with the spreader 92' suspended therefrom as in FIG. 16, is lowered to the container to be handled. Further lowering of the spreader causes the latch portions 13 of the spuds 8 and 8' to enter the container casting slots 16. When such latch portions have entered the slots 16 to a sufficient extent, an operator stationed at the front of the spreader 92' releases the lock of the mechanism by grasping ring 154 and pulling downwardly. This pulls plunger 146 downwardly out of notch 144 (against the bias of spring 150), releasing the mechanism. While holding onto ring 154, the operator pulls downwardly on lanyard 136. This rotates arm 129 and shaft 122 clockwise, moving the spuds 8 and 8' toward their "locked" positions. After arm 129 begins to rotate, ring 154 may be released. The operator continues to pull on lanyard 136 until arm 129 has rotated through 90°, at which time the arm engages stop 140 and plunger 146 moves into notch 145 under the urging of spring 150; when the 90° rotation is complete, the latching portions of all four corner spuds are in their "locked" positions.

For release of the container from the spreader, the spreader is unlocked by pulling first the releasing chain 153 (which pulls plunger 146 downwardly out of notch 145) and then the lanyard 138. The downward pull on lanyard 138 rotates arm 129 and shaft 122 counterclockwise, moving the spuds 8 and 8' toward their "unlocked"

positions. The spuds arrive at their "unlocked" positions when arm 129 engages stop 139 and plunger 146 moves into notch 144 under the urging of spring 150.

The two embodiments of the invention so far described are both "mechanical", wherein arms must be manually rotated (as by means of lanyards) to actuate the latching mechanism from one position to another. There will now be described a "hydraulic" embodiment, wherein hydraulic cylinders effect the actual physical movement (rotation) of the spuds, these hydraulic cylinders being controlled from a remote point, as a result of the operation of pushbuttons. In addition, this "hydraulic" embodiment includes retractable guide members operated by remotely-controlled hydraulic cylinders, in lieu of the fixed aligning bars utilized in the previously-described or "mechanical" embodiments.

Refer now to FIG. 32, which is a top plan view of a spreader frame, with the hydraulic actuating cylinders mounted thereon. The frame for this "hydraulic" embodiment, like the frame of the "mechanical" embodiments, is of rectangular outer configuration, a "forty-foot" frame being illustrated in FIG. 32. The main part of the frame is formed by two long channel members 155 and two shorter channel members 156, the flanges of all four of these channels facing outwardly. A corner box subassembly, which will be further referred to hereinafter, is located at each of the four corners of the frame, and the adjacent ends of the longer and shorter channel members are welded to these subassemblies. At the right front corner of the frame, the right-hand end of the long front channel member 155 and the front end of the short right side channel member 156 are welded to corner box subassembly 157; at the left rear corner of the frame, the left-hand end of the long rear channel member 155 and the rear end of the short left side channel member 156 are welded to corner box subassembly 157, which is a duplicate of the diagonally-opposite corner box subassembly. At the left front corner of the frame, the left-hand end of the long front channel member 155 and the front end of the short left side channel member 156 are welded to corner box subassembly 158, while at the right rear corner, the right-hand end of long rear channel member 155 and the rear end of the short right side channel member 156 are welded to corner box subassembly 158, which is a duplicate of the diagonally-opposite corner box subassembly. The two corner box subassemblies 158 are quite similar to corner box subassemblies 157, but the former pair are of opposite hand with respect to the latter pair.

Near the left-hand end of the frame, a short channel member 159 is welded at its opposite ends to the respective long channel members 155, member 159 extending across the frame parallel to side channel member 156 and being of smaller cross-section than channel members 159. A similar short channel member 159′ is welded to channel members 155 near the right-hand end of the frame. Member 159 may be spaced 21½ inches (measured heel-to-heel) inwardly or to the right of the left-hand side channel member 156, and member 159′ may be spaced the same distance inwardly or to the left of the right-hand side channel member 156. Three short channel members 160 (which are similar to each other and are all smaller in cross-section than members 159 and 159′) are welded at their opposite ends to long channel members 155, members 160 being spaced equidistantly between members 159 and 159′. Members 160 extend across the frame, parallel to members 156 and 159. The ends of members 159, 159′, and 160 are all located at the tops of the long channel members 155.

Four diagonally-extending angle members 161 are welded at their opposite ends to the upper surfaces of the long channel members 155, members 161 extending diagonally across the four open rectangles formed by members 155 and by members 159, 159′, and 160. The four members 161 all extend substantially parallel to each other.

At each of the four corners of the frame, an upstanding lifting pad 162 is welded to the corresponding one of the long channel members 155, each at a location just inwardly from the respective corner box subassembly 157 or 158. The flange and web of the channel members are cut as necessary to accommodate the pads 162, which are made from flat plate stock. The upper ends of the pads 162 extend above the top of the frame, and looking downwardly from above the frame (as in FIG. 32), the vertical mid-plane of each pad makes a small angle with the long channel members 155. The structure at the upper end of each pad 162 is a duplicate of that previously described at 89 and 90, in connection with pads 88. Thus, each pad 162 has at its upper end a suitably reinforced hole, for reception of an anchor shackle pin, to constitute corner attachment means whereby the spreader of FIG. 32 may be suspended from a cargo hook.

Refer now to FIGS. 33, 34, and 35, which are respectively front, side, and sectional views of one of the corner box subassemblies 157, for example, the one at the right front corner of the frame. As previously stated, the two corner box subassemblies 158 are similar to subassemblies 157, but of opposite hand. As in the previously-described embodiments, a bottom corner plate 6 is welded to the long channel member 155 and to the shorter channel member 156, at one end of each of these members.

At its lower end, an upstanding side plate 163 is welded to the upper face of bottom plate 6, the plate 163 being substantially rectangular in outline but having one upper corner cut off at an angle, as illustrated in FIG. 33. One edge of side plate 163 is welded to the adjacent end of channel member 155. Plate 163 forms one wall of the open-cornered box 157. One end of another upstanding side plate 164 is welded to the upper face of bottom plate 6, the plane of plate 164 lying at right angles to the plane of plate 163. Plate 164 is substantially rectangular in outline but has one upper corner cut off at an angle, as illustrated in FIG. 34. One edge of plate 164 is welded to the inner face of plate 163, and the other edge of the former is welded to the adjacent end of channel member 156. Plate 164 forms a second wall of the box 157.

One end of a side plate 165 is welded to the upper face of bottom plate 6, one face of plate 165 being welded to the adjacent end of channel member 155 and one edge of plate 165 being welded to the inner face of plate 163. The plane of plate 165 lies at right angles to the plane of plate 163 and parallel to the plane of plate 164; plate 165 forms a third wall of box 157. Plate 165 is quadrilateral in outline, having its upper end cut off at an angle such that its free edge (i.e., the edge opposite to the one welded to plate 163) is shorter than the just-mentioned one edge. One end of a side plate 166 is welded to the upper face of bottom plate 6, one face of plate 166 being welded to the adjacent end of channel member 156 and one edge of plate 166 being welded to the inner face of plate 164. The plane of plate 166 lies at right angles to the plane of plate 164 and parallel to the plane of plate 163; plate 166 forms a fourth wall of box 157. Plate 166 (like plate 165) is quadrilateral in outline, having its upper end cut off at an angle such that its free edge (i.e., the edge opposite to the one welded to plate 164) is shorter than the just-mentioned one edge.

The side plates 165 and 166 are narrower and shorter than the plates 163 and 164, plate 166 being similar in dimensions to plate 165 but of opposite hand. It may be stated here that the dimensions of plates 163 and 164 are similar to each other. Due to the fact that plates 165 and 166 are narrower than plates 163 and 164, the box 157 has an open corner (see FIG. 35). Referring again to FIG. 32, it may be seen that the open corners of the four corner boxes 157 and 158 all face toward the center of the frame.

Now refer to FIGS. 36 and 37, which are typical sectional views through the latch mechanism located at the corners of the frame of FIG. 32. FIG. 36 illustrates the latch mechanism located at the right-hand front corner of the frame and is thus generally similar to FIG. 2, except that for FIG. 36 the section is taken along a line which is vertical in FIG. 32, so that the shorter side channel member 156 is shown. FIG. 37 is then similar to a plan view of the latch mechanism shown in FIG. 36.

Speaking generally, at each of the four bottom corners of the frame of FIG. 32 a corner plate 6 is welded, as previously described in connection with FIGS. 33–35. At each corner, the lower portion of the cylindrical shank of a spud 8″ passes freely through a hole 7 in the respective corner plate 6. The spud members 8″ are similar to the spuds 8 previously described, except that the cylindrical shanks of spuds 8″ are somewhat longer and the cylindrical upper ends of spuds 8″ are somewhat shorter. In the embodiment of the invention now being described, each of the spud members 8″ is mounted within a respective corner box 157 or 158.

As previously described in connection with FIG. 2, a nut 9 engages threads carried by the cylindrical shank of stud 8″ and bears rather loosely against the upper face of bottom corner plate 6; arcuate guide members 12 are provided on the underside of bottom plate 6.

It is to be understood that the elements 6, 7, 8″, 9, 10, 11, 12, anr 13 are duplicated at each of the four bottom corners of the spreader frame of FIG. 32. The spuds 8″ are mounted for rotary motion, each within its respective corner box 157 or 158, the cylindrical portion at the extreme upper end of the spud shank being journaled for rotation within an aperture provided in a bearing plate 17 welded to the inner face of the respective box wall 163.

Arm 20 has at one end thereof a square hole which fits on the square portion 19 of spud 8″. The other end of arm 20 is pivotally mounted at the bifurcated end of a clevis 167, by means of a pin 168 which passes through holes at the ends of the two clevis arms and through a hole in the arm 20. One end of a stud 169, which is threaded at both ends, is threaded into a tapped hole provided in the base of clevis 167, a hex nut 170 being threaded onto this stud to lock the items 169 and 167 together securely. Stud 169 passes through an inverted U-shaped slot provided in one end of a mounting pad 171 whose opposite end is welded to the inner face of channel member 156. The opposite end of stud 169 is threaded into a female threaded fitting 172 (having wrench flats) mounted at the outer end of a hydraulic piston rod 173, a hex nut 174 being threaded onto this end of the stud to lock the end thereof securely in fitting 172. The hydraulic piston to which rod 173 is attached fits within, and is operated by, a hydraulic cylinder 175. Hydraulic cylinder 175 has, at the end thereof opposite rod 173, a clevis-type (two-arm) mount which is secured by means of a pin 176 to a mounting pad 177 welded to the inner face of channel member 156; pin 176 passes through holes provided in the two arms of the cylinder mount and through a hole in pad 177.

The hydraulic cylinder 175 is of the double-acting type, with two separate hydraulic ports, and the piston rod 173 has a six-inch stroke; the rod 173 moves longitudinally back and forth with respect to fixed cylinder 175, and is shown at one end of its range of movement. The clevis 167 enables a linear (longitudinal) movement of stud 169 to cause a rotary movement of arm 20, about a center of rotation located on the longitudinal axis of spud 8″. When stud 169 moves toward the left in FIG. 37, the arm 20 is made to move clockwise, viewed from above as in this figure. The arm 20 has a range of travel of 90° of arc, as indicated by arrow 178; the arc described is one-quarter of the circumference of a circle whose center is on the longitudinal axis of spud 8″ and whose radius is the horizontal distance between such longitudinal axis and the center of pin 168. This 90° rotation of arm 20 produces a 90° rotation of spud 8″, from the "unlocked" position illustrated in FIG. 36 to the "locked" position. Thus, when stud 169 moves toward the left in FIG. 37 throughout its range of travel, spud 8″ rotates from its "unlocked" or "unlatching" position to its "locked" or "latching" position.

The pad 171 provides a fixed abutment for limiting stops which limit the total amount of travel of stud 169. In the position of this stud which is illustrated, a hex nut 179, threaded on stud 169 and held in position thereon by a jam nut 180 which is also threaded on this stud, engages that face of pad 171 toward cylinder 175 and prevents further movement of stud 169 toward the right in FIGS. 36–37; a tripping lever 181 (to be later described) is mounted between nuts 179 and 180. A hex nut 182, threaded on stud 169 between nuts 179 and 170 and held in position thereon by a jam nut 183 which is also threaded on this stud, engages that face of pad 171 toward clevis 167 to prevent the travel of stud 169 toward the left beyond the amount of travel called for by arc 178. This latter amount, of course, is that required to effect the rotation of spud 8″ from the "unlocked" position illustrated to the "locked" position.

One end of the tripping lever 181 is mounted on stud 169, and the other end of this lever extends upwardly from this stud to engage (in the illustrated position of the stud) the operating button of a limit switch (for example, a microswich) 184, or to engage (when stud 169 has moved to the left end of its range of travel) the operating button of another limit switch 185. The limit switches 184 and 185 are individually connected in circuit with respective pilot lights located at a control station (e.g., in the winch house), and function to turn on such lights when a corresponding one of the switches is operated by the tripping lever 181. Switch 184 is operated (to turn on a corresponding pilot light) when the spud 8″ is in "unlocked" position, and switch 185 is operated (to turn on its pilot light) when the spud 8″ is in "locked" position. In this way, by looking at his pilot light panel, the operator may determine the positions of all four of the corner spuds on the spreader frame. The switches 184 and 185 are mounted in position by being bolted to U-shaped brackets 186 whose legs are welded to the inside of channel member 156.

The constructional arrangement described in connection with FIGS. 36 and 37 is typical of that provided at each of the four corners of the spreader frame of FIG. 32. All of the elements 167 through 177 and 179 through 186, as well as the elements 6, 7, 8″, 9–13, and 17–20, are duplicated (really, triplicated) at the three remaining corners of the spreader frame—to wit, the left front, left rear, and right rear corners (referring to FIG. 32). Referring to this last-mentioned figure, on which the arms 20 are indicated somewhat schematically, at each of the four corners of the frame the line joining the centers of the two apertures in each respective arm 20 (which line may be termed the center line of the arm) lies (in the illustrated "unlocked" position of the latching mechanism) at an angle of substantially 45° to the direction of the length of side channel members 156, and at each corner the respective hydraulic cylinder 175, when operated to move the latching mechanism to the "locked" position, moves the free end of its respective arm toward the longitudinal center line of the frame. Thus, at the left front corner, the arm 20 rotates counterclockwise from the position illustrated to the "locking" position; at the left rear corner, the arm 20 rotates clockwise from the position illustrated to the "locking" position; at the right rear corner, the arm 20 rotates counterclockwise from the position illustrated to the "locking" position; at the right front corner, the arm 20 rotates clockwise from the position illustrated to the "locking" position.

As previously indicated, each of the four corner spuds 8″ has its own individual double-acting hydraulic cylinder 175. Each cylinder can be operated selectively to either its "unlocked" or its "locked" position (due to the double-acting character of these cylinders, which can be hydraulically energized in a selective manner to move their respective rods 173 in one direction or the other), but all four of the cylinders 175 are hydraulically intercoupled to be controlled by a common control (for example, of the push-button type), so that all four spuds may be simultaneously operated to either the "locked" position or to the "unlocked" position. Thus, two push-buttons would be utilized for the four spuds, one for "locking" all four of them and the other for "unlocking" all four of them. In this connection, it is pointed out that a remotely-controllable hydraulic unit (not shown, but including a hydraulic reservoir, valves, a hydraulic pump, etc.) is mounted on the spreader frame, and from this unit two manifold hydraulic conduits (one for "locking" and the other for "unlocking") extend to the four hydraulic cylinders 175 mounted at the respective corners of the frame. In this connection, it is pointed out that a control panel (having two push-buttons for operating the spuds, as well as other push-buttons for operating mechanisms which will be hereinafter dsecribed, together with pilot lights) for operating the "hydraulic" spreader being described may be located in the winch house of the vessel; a "walk-around" control panel may also be provided, so that the spreader may be operated while an ambulatory operator is overlooking the pier or the cargo hold.

Although not illustrated in the drawings, four wheels are preferably mounted in each of the corner boxes 157 and 158, these wheels being journaled for free rotation on shafts fixed in the corner boxes and the peripheries of the wheels extending outwardly slightly beyond the long side walls (such as 163 and 164) of the boxes. The purpose of these wheels is to prevent "jamming" of the spreader frame within the container guide system of the ship, by providing a rolling contact between the spreader and the guides. A pair of wheels would be mounted near the lower end of each corner box, the individual wheels of this pair having their shafts at right angles to each other, such that one wheel would extend outwardly beyond wall 163 and the other outwardly beyond wall 164; another pair of wheels would be mounted near the upper end of each corner box, the individual wheels of this other pair having their shafts at right angles to each other, like the first pair.

Refer now to FIG. 38, which is a view looking at the bottom of one of the corner boxes (for example, box 157) but omitting the spud 8″ (it is here noted that the spud has also been omitted from FIG. 33, the hole 7 for such spud being shown, however, in this latter figure). An upper plate 187 (see FIGS. 33–35) is welded around its edges within each of the corner boxes 157 and 158, this plate conforming in shape to the open-cornered interior of the corner box and being parallel to the bottom plate 6; the plate 187 lies in the same horizontal plane as the upper edge of channel members 155 and 156.

It will be noted that FIG. 38 is somewhat similar to FIG. 4. A hole 188 (see also FIG. 34) is drilled through the respective bottom plate 6 at each of the four corners of the frame, at a location near to hole 7 and guides 12, and the lower end of hole 188 is counterbored to a larger diameter as at 189. A hole 190, of the same diameter as hole 188, is drilled through upper plate 187, in vertical alignment with hole 188. A shaft 191, having an enlarged head 192 at its lower end (see FIG. 39), and carrying threads at its upper end, is mounted for free longitudinal (vertical) movement in holes 188 and 190, with the head 192 located in the counterbore 189. Shaft 191 is held in position by means of a nut 193 threaded onto the upper end of the shaft and bearing against the upper face of plate 187; a jam nut 194 is also threaded onto shaft 191 to hold nut 193 securely in position. One end of a compression spring 195 (which surrounds shaft 191 and is positioned within counterbore 189) bears against the upper side of head 192, and the other end of this spring bears against the bottom plate 6, at the inner end of counterbore 189. Spring 195 urges shaft 191 downwardly, that is, it opposes upward movement of this shaft. In the "rest" or "unoperated" position of shaft 191 which is illustrated, the bottom face of hear 192 is located slightly (about $\frac{3}{16}$ inch, for example) below the bottom face of bottom plate 6.

The upper end of shaft 191 is adapted to cooperate with the operating button 196 of a limit switch (microswitch) 197 which is mounted directly above this shaft, as by means of brackets 186 welded to the inner face of side plate 164. In the "rest" position of shaft 191, there is a small vertical clearance between button 196 and the upper end of shaft 191, so that switch 197 is then "unoperated". However, when the spreader frame is lowered onto the top of a container so that the bottom face of plate 6 engages the upper surface of the container, head 192 comes into contact with the container and shaft 191 is moved upwardly (against the bias of spring 195) so that the upper end of shaft 191 engages button 196 to "operate" switch 197.

The limit switch 197 is electrically connected into the control system for the hydraulic cylinder 175 in such a way that when this switch is "unoperated" (after having previously been "operated") the hydraulic cylinder cannot be actuated from a "latch locking" to a "latch unlocking" position. Therefore, accidental "unlocking" of the latches is prevented when a container is being lifted by the spreader. When the spreader is lowered into contact with a container for lifting purposes, shaft 191 "operates" switch 197, since the latches are then in "unlocked" position and can enter into the container slots 16 (FIG. 7) sufficiently to allow head 192 to contact the container. The latches are then "locked," in the manner previously described. When the spreader is thereafter lifted after being "locked" to the container, the bottom of the spreader rises sufficiently above the top of the container (even though the latches are then "locked" in the container corner fittings 15) to allow shaft 191 to return to its "rest" position and switch 197 to become "unoperated". This prevents "unlocking" of the latches (as previously described) until the spreader is again lowered into contact with the top of the container, for "unlocking" of the spreader therefrom (at which time switch 197 will again be "operated" by shaft 191). This "operation" of switch 197 allows the spuds to be moved to the "unlocked" position, and they remain "unlocked" until after the spreader is lowered onto another container for the next lifting assignment.

As previously stated, the construction just described (in connection with FIGS. 38 and 39) is duplicated for each of the four corners of the frame, so that elements 186–197 are repeated at each of the frame corners. Accidental "unlocking" of the spuds is prevented when any one of the four switches 197 becomes "unoperated" (after having previously been "operated").

The "hydraulic" embodiment of the invention now being described also includes six retractable guides mounted at the edges of the frame, these guides being selectively operable (by means of hydraulic actuating mechanisms) to either a "down" position or an "up" position. These guides correspond generally in function to the aligning bars previously described in connection with FIGS. 17 and 18, although the guides now to be described are retractable, rather than being fixed as in FIGS. 17 and 18. In the "down" or "operative" position, these guides project downwardly below the bottom of the channel members 155 or 156 and, as the spreader is lowered downwardly over the container to be lifted, engage the sides of the container and "nudge" the spreader in one direction or another, as required to assure accurate lateral alignment of the spreader with the container. In the "up" or "inoperative" position, these guides are essentially located within the channels 155 or 156; as previously stated, the flanges of these channels face outwardly.

One of the aforementioned guides is located at the center of each of the two shorter sides of the frame, one is located adjacent each of the two ends of the left-hand short channel member 159, and one is located adjacent each of the two ends of the right-hand short channel member 159'.

Figure 40:
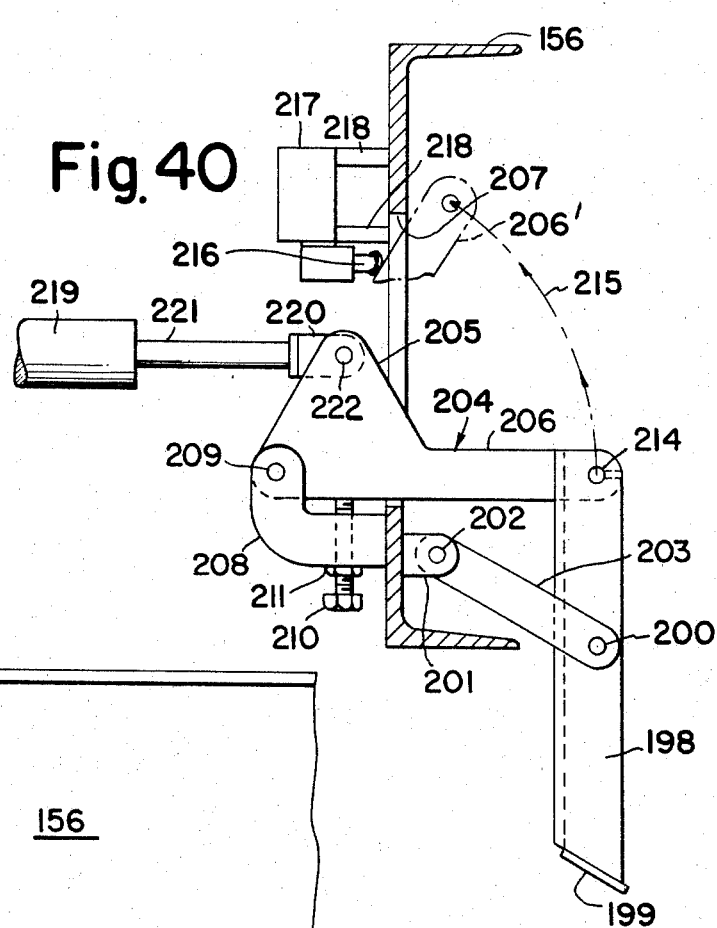
FIG. 40 is a vertical sectional view illustrating a retractable guide structure.
Figure 41:
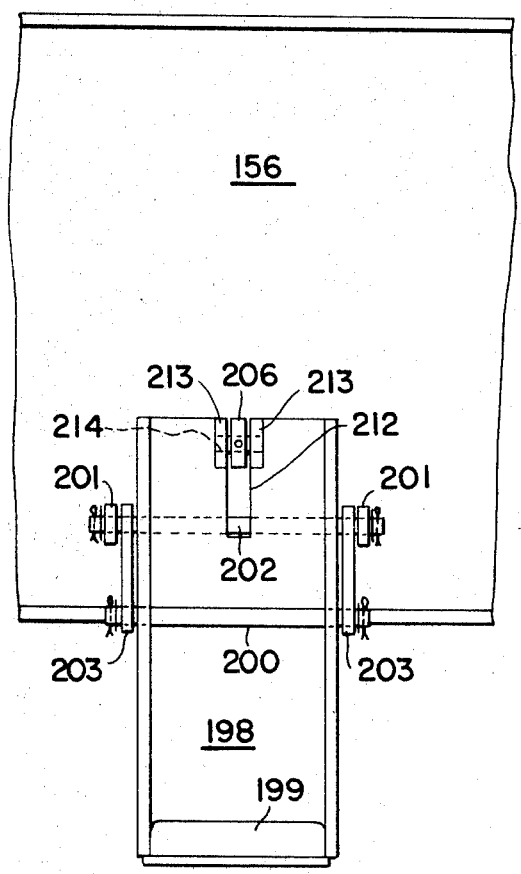
FIG. 41 is a front elevation of the structure of FIG. 40.

Refer now to FIGS. 40–42, which are typical and illustrate one of the retractable guides, for example the one located at the center of the left-hand shorter side of the frame of FIG. 32. The six retractable guides are all exactly the same in construction. A channel member 198 (for example, a piece of six-inch-by-two-inch channel) forms the main operating part of the guide, this member having its lower end beveled at a 30° angle and a flat plate 199 being welded across such lower end. The member 198 is mounted to extend in a substantially vertical direction, with its flanges facing outwardly, and in the "down" or "operative" position illustrated in the drawings, projects downwardly below the bottom of the channel member 156.

A round bar 200 is welded through the flanges of channel 198 at a location somewhat above the midpoint of the length thereof, the opposite ends of this bar extending through holes drilled in the two flanges of the channel. A pair of laterally-aligned mounting brackets 201 are welded to the outer face of the web of channel 156, and an elongated horizontally-extending pin 202 is journaled for free rotation at its opposite ends in suitable holes provided in brackets 201. A pair of similar rigid and parallel link members 203 are provided for pivotally mounting the guide 198–199 on channel 156, and for constraining this guide to remain approximately vertical as it moves from its "down" position to its "up" position, and vice versa. One of these links is positioned on each respective side of channel 198, between the channel flange and the respective adjacent bracket 201. One end of each link is pivotally mounted on pin 202, and the other end of each link is pivotally mounted on the respective extending end of bar 200.

An actuating arm 204 is coupled to the upper end of channel member 198, for moving this channel between its "up" and "down" positions. Arm 204 has a triangular portion 205 and a base extension portion 206. A dumbbell-shaped slot 207 (see FIG. 42) is cut in the web of channel member 156 to accommodate the movement of arm 204 with respect to this member. One end of an L-shaped mounting pad 208 (shown for simplicity in somewhat isolated form in FIG. 42) is welded to the inner face of the web of channel 156, and the other end of pad 208 is pivotally connected by means of a pin 209 (similar in construction to pin 176) to one corner of the triangular portion 205 of arm 204. The center line of pin 209 lies in the same horizontal plane as the center of the lower enlarged end of slot 207 (see FIG. 42), and pad 208 provides a fixed pivotal mount for arm 204.

The upper end of a bolt 210, which is threaded in a vertical tapped hole provided in the horizontally-extending leg of pad 208, provides a stop which limits the clockwise (in FIG. 40) rotation of arm 204, that is, the downward movement of arm base portion 206 and of channel member 198; the lower edge of arm base portion 206 comes into engagement with the upper end of bolt 210 to limit the downward travel of this arm portion. Bolt 210 is held in an adjusted position by means of a jam nut 211 threaded on this bolt and engaging the lower edge of pad 208. For simplicity, the bolt 210, arm 204, and pin 209 are not shown in FIG. 42.

A central vertical slot 212 is cut in the web of channel 198, downwardly from the upper end of member 198, to accommodate the movement of arm base portion 206 with respect to member 198. A pair of brackets 213, somewhat similar in shape to brackets 201, are welded to the outer face of the web of channel 198, one bracket on either side of slot 212, and a pin (not shown, but similar in construction to pin 176), which passes through hole 214 in the end of arm base portion 206 and through aligned holes in brackets 213, pivotally connects arm 204 to channel member 198.

Arm 204 is rotated back and forth about its stationary axis defined by pivot pin 209 by means of a hydraulic actuating mechanism, hereinafter described. When this arm rotates counterclockwise from the position illustrated in FIG. 40, the outer end of base portion 206 (i.e., the end thereof at hole 214) moves upwardly along the arcuate path indicated by arrow 215. As it does so, the channel member 198 moves upwardly also, but the spacing link members 203 cause this channel member to be maintained approximately vertical as its upper end moves along arc 215, with the result that the guide channel member moves into the partially enclosed space defined by the flanges and web of channel member 156. Slot 207 allows this movement of arm 204 to take place, it being remembered that pivot pin 209 and hole 214 are on opposite sides of the web of channel member 156.

The uppermost (or most counterclockwise) position of base portion 206 is indicated by the dot-dash line 206', this latter position being the "up" or "inoperative" position of guide 198–199, wherein the latter is contained within channel member 156 and is thus lifted sufficiently to be located above a container positioned below the spreader frame. In the "down" or "operative" position illustrated, as will be appreciated, the guide 198–199 can come into contact with a container positioned below channel member 156 of the spreader frame.

It has been stated above that the channel member 198 is maintained approximately vertical as its upper end moves along arcuate path 215. What actually happens, of course, is that the axis of bar 200 (the approximate center of length of channel member 198) moves along an arc whose center is at the center of pin 202 and whose radius is the distance between the centers of pin 202 and of bar 200.

When the arm portion 206 reaches its "up" position at 206', the upper edge of this arm portion comes into engagement with the operating button 216 of a limit switch (microswitch) 217 which is mounted in position adjacent the upper end of slot 207 by means of a pair of brackets 218 (similar in configuration to brackets 186), to which switch 217 is bolted. When this engagement of arm portion 206 and button 216 occurs, switch 217 is "operated." This switch is connected in circuit with a pilot light located at the control station, turning on the pilot light when switch 217 is "operated" to inform the operator that this particular guide is in its "up" or "inoperative" position. For convenience, the switch 217 is not illustrated in FIG. 42, although the switch mounting brackets 218 are shown in this latter figure.

As previously indicated, FIGS. 40–42 are typical of the construction of the six retractable guide arrangements utilized in the spreader presently being described. That is to say, elements 198–214 and 216–218 are duplicated, at each of the six locations previously mentioned around the spreader frame. (See FIG. 32, wherein the six retractable guide members 198 are illustrated.) Thus, a total of six retractable guides are provided, and six microswitches, one for each guide; six pilot lights would be provided for the guides at the control station, one for each individual retractable guide.

Referring again to FIG. 40, the actuating means for the retractable guide 198–199 comprises a hydraulic cylinder 219, there being a separate hydraulic cylinder for each of the six retractable guides and each of these cylinders being similar to hydraulic cylinders 175 previously described. A rod clevis 220 is threaded into the female threaded fitting provided at the outer end of hydraulic piston rod 221, and the bifurcated end of rod clevis 220 is pivotally secured to a second corner of the triangular portion 205 of arm 204, by means of a pin 222 (similar in construction to pin 176). Piston rod 221 is driven longitudinally (i.e., in the direction of its length) when hydraulic cylinder 219 is appropriately actuated. Hydraulic cylinder 219 is double-acting. When rod 221 moves to the left from the position illustrated in FIG. 20, arm 204 is caused to rotate in the counter-clockwise direction, moving base extension 206 along arc 215 and lifting guide channel 198 "up," as previously indicated. When this guide channel is "up," a movement of rod 221 to the right (as a result of appropriate actuation of hydraulic cylinder 219) causes arm 204 to rotate in the clockwise direction, lowering guide channel 198 to the "down" position illustrated in FIG. 40.

Refer again to FIG. 32. The hydraulic cylinders 219 for the two retractable guides 198 which are located at the centers of the two shorter sides 156 of the frame both extend parallel to the major or longitudinal center line of the spreader. The fixed clevis-type mounts of these two cylinders are each pinned (as by pins similar to 176) to one end of a respective pad 223. The other ends of pads 223 are welded to the respective short channel members 159 and 159'. The hydraulic cylinders 219 for the four restractable guides 198 which are located near the respective ends of the two longer sides 155 of the frame all extend parallel to the minor or transverse center line of the spreader. For the mounting ends of each of these four latter cylinders, an L-shaped bracket 224 is provided, one leg of these brackets being welded to the adjacent short channel member 159 or 159' and the other legs of these brackets being pinned to the clevis-type mounts of the respective cylinders.

The hydraulic connections to the hydraulic cylinders 219 for the retractable guides are made in such a way that four double-acting controls (or eight push-buttons, four for moving the guides "up" and four for moving the guides "down") would be provided at the control station. One of the double-acting controls (or two push-buttons) would operate the retractable guide 198 located at the center of the left-hand shorter side 156 of the frame; a second double-acting control would operate the guide 198 located at the center of the right-hand shorter side 156 of the frame; a third double-acting control would operate simultaneously the two guides 198 on the rear long side 155 of the frame; a fourth double-acting control would operate simultaneously the two guides 198 on the front long side 155 of the frame. Thus, some manifolding of the hydraulic conduits for the cylinders 219 would be involved.

The hydraulic conduits for the various hydraulic cylinders 175 and 210 (ten hydraulic cylinders in all) has not been illustrated, since it is felt that to do so would unduly complicate the drawings and unduly lengthen the present specification. The arrangement of such conduits should be readily apparent to those skilled in the art, from a study of the foregoing description.

The invention claimed is.

1. For handling a hexhedral container of standard size provided at each of its four upper corners with a respective latching abutment of the type wherein rotary motion is required to move a mating latching member into engagement with such abutment, apparatus comprising a substantially rigid frame having a rectangular outer configuration conforming to the length and width of the container to be handled; a separate latching member rotatably mounted at each of the four corners of said frame, each of said latching members being constructed and arranged to come into functional relation with a respective one of said abutments when said frame is positioned above the container to be handled, a shaft rotatably mounted in said frame intermediate the ends of one of the longer side members thereof, means for manually rotating said shaft, a first elongated drive rod extending parallel to said one longer side member and supported thereby for longitudinal linear movement, a first mechanical linkage coupling one end of said rod to said shaft, a second mechanical linkage coupling the other end of said rod to the latching member at one end of said one longer side member, a second elongated drive rod extending parallel to said one longer side member and supported thereby for longitudinal linear movement, a third mechanical linkage having certain elements in common with said first linkage and coupling one end of said second rod to said shaft, and a fourth mechanical linkage coupling the other end of said second rod to the latching member at the other end of said one longer side member.

2. Apparatus in accordance with claim 1, wherein said first and third linkages are constructed and arranged to convert rotary movement of said shaft to linear movement of the respective rods.

3. Apparatus in accordance with claim 1, wherein said second and fourth linkages are constructed and arranged to convert linear movement of the respective rods to rotary movement of the respective latching members.

4. Apparatus in accordance with claim 1, wherein said shaft has its axis in the vertical mid-plane of said one longer side member, and wherein said manual rotating means comprises a lanyard arm secured to the outer end of said shaft.

5. For handling a hexahedral container of standard size provided at each of its four upper corners with a respective latching abutment of the type wherein rotary motion is required to move a mating latching member into engagement with such abutment, apparatus comprising a substantially rigid frame having a rectangular outer configuration conforming to the length and width of the container to be handled; a separate latching member rotatably mounted at each of the four corners of said frame, each of said latching members being constructed and arranged to come into functional relation with a respective one of said abutments when said frame is positioned above the container to be handled, four hydraulic cylinders each having one end thereof secured to said frame adjacent a respective one of the four corners thereof; a separate elongated drive rod secured at one end thereof to the other end of each respective one of said cylinders, each of said drive rods extending parallel to a shorter side member of said frame and being supported thereby for longitudinal substantially linear movement; a separate mechanical linkage coupling the other end of each of said drive rods to a respective one of said latching members, and common manually-operable control means for activating all of said cylinders.

6. Apparatus in accordance with claim 5, wherein said linkages are constructed and arranged to convert linear movement of the respective rods to rotary movement of the respective latching members.

7. For handling a hexahedral container of standard size provided at each of its four upper corners with a respective latching abutment of the type wherein rotary motion is required to move a mating latching member into engagement with such abutment, apparatus comprising a substantially rigid frame having a rectangular outer configuration conforming to the length and width of the container to be handled; a separate latching member rotatably mounted at each of the four corners of said frame, each of said latching members being constructed and arranged to come into functional relation with a respective one of said abutments when said frame is positioned above the container to be handled, manually-operable means carried by said frame for causing simultaneous rotation of all four of said latching members, and manually-releasable locking means for locking said manually-operable means in a fixed position, thereby preventing premature operation thereof.

8. For handling a hexahedral container of standard size, apparatus comprising a substantially rigid frame having a rectangular outer configuration conforming to the length and width of the container to be handled, said frame being adapted to be brought, for container handling purposes, into vertically-aligned, superposed relationship with the upper face of said container; a guide member carried by said frame and movable between extended and retracted positions, said guide member in its extended position projecting below the lower face of said frame and being located outside the outer edge of said frame, and in its retracted position being located above the lower face of said frame and within the outer edge of said frame; and means for moving said guide member from its retracted position to its extended position and vice versa.

9. Apparatus as defined in claim 8, wherein said means comprises a source of motive power controllable from a remote point.

10. Apparatus as defined in claim 8, wherein said means comprises a hydraulic cylinder carried by said frame, a motion-transmitting means coupled between said hydraulic cylinder and said guide member, and manually-operable control means for activating said cylinder.

11. Apparatus as defined in claim 10, wherein said cylinder is double-acting, and is selectively activatable to move said guide member either to its extended position or to its retracted position.

12. Apparatus according to claim 8, including a plurality of guide members similar to said guide member, all of said guide members being carried by said frame and such members being located at spaced points around the sides of said frame, each of said guide members being movable between the said extended position and the said retracted position; and a separate source of motive power for moving each respective guide member from its retracted position to its extended position and vice versa.

13. Apparatus as defined in claim 12, wherein each source of motive power comprises a separate hydraulic cylinder coupled to each respective guide member.

14. Apparatus as defined in claim 13, wherein each of said cylinders is double-acting, and is selectively activatable to move its respective coupled guide member either to its extended position or to its retracted position.

References Cited

UNITED STATES PATENTS

| | | | |
|---|---|---|---|
| 2,963,310 | 12/1960 | Abolins | 294—67.4 |
| 3,015,407 | 1/1962 | Fesmire et al. | 294—67.4 |
| 3,078,115 | 2/1963 | Harlander et al. | 294—67.4 |
| 3,151,904 | 10/1964 | Tantlinger | 294—67.4 |
| 3,151,904 | 10/1964 | Tantling | 294—67.4 |

ANDRES H. NIELSEN, *Primary Examiner.*

U.S. Cl. X.R.

294—81